US008786521B2

(12) United States Patent
Kaule et al.

(10) Patent No.: US 8,786,521 B2
(45) Date of Patent: Jul. 22, 2014

(54) REPRESENTATION SYSTEM

(75) Inventors: Wittich Kaule, Emmering (DE);
Michael Rahm, Hemau (DE); Wolfgang Rauscher, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 1020 days.

(21) Appl. No.: 12/665,078

(22) PCT Filed: Jun. 25, 2008

(86) PCT No.: PCT/EP2008/005172
§ 371 (c)(1),
(2), (4) Date: Dec. 17, 2009

(87) PCT Pub. No.: WO2009/000528
PCT Pub. Date: Dec. 31, 2008

(65) Prior Publication Data
US 2010/0182221 A1 Jul. 22, 2010

(30) Foreign Application Priority Data
Jun. 25, 2007 (DE) .......................... 10 2007 029 203

(51) Int. Cl.
*G09G 5/00* (2006.01)
(52) U.S. Cl.
USPC ............................................. 345/9; 359/619
(58) Field of Classification Search
USPC ................ 345/9, 240; 359/619, 622
See application file for complete search history.

(56) References Cited

U.S. PATENT DOCUMENTS

| 1,475,430 | A | 11/1923 | Curwen |
| 5,712,731 | A | 1/1998 | Drinkwater et al. |
| 5,723,200 | A | 3/1998 | Oshima et al. |
| 5,772,250 | A | 6/1998 | Gasper |
| 6,288,842 | B1 | 9/2001 | Florczak et al. |
| 6,329,040 | B1 | 12/2001 | Oshima et al. |
| 6,483,644 | B1 | 11/2002 | Gottfried et al. |
| 7,667,894 | B2 | 2/2010 | Hoffmuller |
| 7,728,931 | B2 | 6/2010 | Hoffmuller |
| 7,808,605 | B2 | 10/2010 | Hoffmuller |

(Continued)

FOREIGN PATENT DOCUMENTS

| DE | 3602563 C1 | 4/1987 |
| DE | 19949542 A1 | 4/2001 |

(Continued)

OTHER PUBLICATIONS

Durand F., Photography—Reversible Prints, Integral Photographs, (English translation of article by Lippman), Academy of the Sciences, Mar. 2, 1908 session, 4 pages.

(Continued)

*Primary Examiner* — Calvin C Ma
(74) *Attorney, Agent, or Firm* — Lathrop & Gage LLP

(57) ABSTRACT

The present invention relates to a depiction arrangement for security papers, value documents, electronic display devices or other data carriers, having a raster image arrangement for depicting a planar target image that is given by an image function f(x,y), having a motif image that is subdivided into a plurality of cells (24), in each of which are arranged imaged regions of the target image a viewing grid (22) composed of a plurality of viewing elements for reconstructing the target image when the motif image is viewed with the aid of the viewing grid (22), the motif image exhibiting, with its subdivision into a plurality of cells, an image function m(x,y).

50 Claims, 10 Drawing Sheets

(56) References Cited

U.S. PATENT DOCUMENTS

Figure 1:
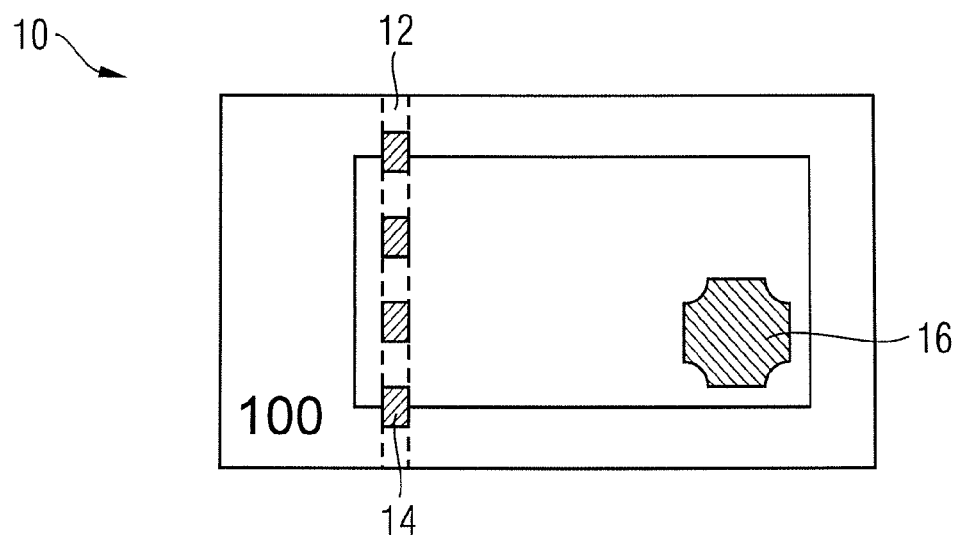

| | | | |
|---|---|---|---|
| 7,986,459 B2 | 7/2011 | Kaule | |
| 8,083,894 B2 | 12/2011 | Gruszczynski | |
| 8,149,511 B2 | 4/2012 | Kaule | |
| 2006/0003295 A1 | 1/2006 | Hersch et al. | |
| 2006/0256435 A1 | 11/2006 | Relke | |
| 2007/0165182 A1 | 7/2007 | Hoffmuller | |
| 2007/0177131 A1 | 8/2007 | Hansen | |
| 2007/0211238 A1 | 9/2007 | Hoffmuller | |
| 2007/0216518 A1 | 9/2007 | Hoffmuller | |
| 2007/0229263 A1 | 10/2007 | Staub et al. | |
| 2007/0229928 A1 | 10/2007 | Hoffmuller | |
| 2007/0241553 A1 | 10/2007 | Heim | |
| 2007/0246933 A1 | 10/2007 | Heim | |
| 2007/0274559 A1 | 11/2007 | Depta | |
| 2008/0014378 A1 | 1/2008 | Hoffmuller | |
| 2008/0037131 A1 | 2/2008 | Steenblik et al. | |
| 2008/0054621 A1 | 3/2008 | Burchard | |
| 2008/0079257 A1 | 4/2008 | Fessl | |
| 2008/0088859 A1 | 4/2008 | Depta | |
| 2008/0160226 A1 | 7/2008 | Kaule et al. | |
| 2008/0163994 A1 | 7/2008 | Hoppe | |
| 2008/0182084 A1 | 7/2008 | Tompkin et al. | |
| 2008/0198468 A1 | 8/2008 | Kaule et al. | |
| 2008/0216976 A1 | 9/2008 | Ruck | |
| 2008/0250954 A1 | 10/2008 | Depta | |
| 2008/0258456 A1 | 10/2008 | Rahm | |
| 2008/0259416 A1 | 10/2008 | Peters et al. | |
| 2009/0001709 A1 | 1/2009 | Kretschmar | |
| 2009/0008923 A1 | 1/2009 | Kaule et al. | |
| 2009/0008926 A1 | 1/2009 | Depta | |
| 2009/0102605 A1 | 4/2009 | Kaule | |
| 2009/0115185 A1 | 5/2009 | Hoffmuller | |
| 2009/0218397 A1 | 9/2009 | Wild et al. | |
| 2009/0236061 A1 | 9/2009 | Gruszczynski | |
| 2009/0290221 A1 | 11/2009 | Hansen et al. | |
| 2009/0297805 A1 | 12/2009 | Dichtl | |
| 2009/0322071 A1 | 12/2009 | Dichtl | |
| 2010/0175843 A1 | 7/2010 | Gregarek | |
| 2010/0177094 A1 | 7/2010 | Kaule et al. | |
| 2010/0182221 A1 | 7/2010 | Kaule et al. | |
| 2010/0194091 A1 | 8/2010 | Heim | |
| 2010/0194532 A1 | 8/2010 | Kaule et al. | |
| 2010/0196587 A1 | 8/2010 | Keller | |
| 2010/0207376 A1 | 8/2010 | Heim | |
| 2010/0208036 A1 | 8/2010 | Kaule | |
| 2010/0307705 A1 | 12/2010 | Rahm | |
| 2010/0308570 A1 | 12/2010 | Heim | |
| 2010/0320742 A1 | 12/2010 | Hoffmuller | |
| 2011/0007374 A1 | 1/2011 | Heim | |
| 2011/0012337 A1 | 1/2011 | Heim | |
| 2011/0027538 A1 | 2/2011 | Hoffmann | |
| 2011/0045248 A1 | 2/2011 | Hoffmuller et al. | |
| 2011/0069360 A1 | 3/2011 | Dichtl | |
| 2011/0079997 A1 | 4/2011 | Heim | |
| 2011/0091665 A1 | 4/2011 | Heim | |
| 2011/0095518 A1 | 4/2011 | Hoffmuller | |
| 2011/0101670 A1 | 5/2011 | Heim | |
| 2011/0109078 A1 | 5/2011 | Hoffmuller | |
| 2011/0114733 A1 | 5/2011 | Heim | |
| 2011/0157183 A1 | 6/2011 | Kaule | |
| 2012/0126525 A1 | 5/2012 | Dorfler | |
| 2012/0168515 A1 | 7/2012 | Schutzmann | |
| 2012/0170124 A1 | 7/2012 | Fuhse | |

FOREIGN PATENT DOCUMENTS

| | | | |
|---|---|---|---|
| DE | 102004007379 B3 | 9/2005 | |
| DE | 102004031879 A1 | 1/2006 | |
| DE | 102004059798 A1 | 6/2006 | |
| DE | 102005028162 A1 | 12/2006 | |
| DE | 102005052562 A1 | 5/2007 | |
| DE | 102005062132 A1 | 7/2007 | |
| DE | 102006006501 A1 | 8/2007 | |
| DE | 102006029536 A1 | 12/2007 | |
| DE | 102006029850 A1 | 1/2008 | |
| DE | 102007029203 A1 | 1/2009 | |
| DE | 102007062089 A1 | 7/2009 | |
| EP | 0064067 A1 | 11/1982 | |
| EP | 0238043 A2 | 9/1987 | |
| EP | 0330733 A1 | 9/1989 | |
| EP | 1554700 B1 | 1/2007 | |
| EP | 1953002 A2 | 1/2008 | |
| GB | 2362493 A | 11/2001 | |
| JP | 10035083 A | 2/1998 | |
| JP | 2001 055000 A | 2/2001 | |
| JP | 2003 039583 A | 3/2003 | |
| JP | 2003 120500 A | 4/2003 | |
| WO | WO 94/27254 A1 | 11/1994 | |
| WO | WO 99/13157 A1 | 3/1999 | |
| WO | WO 03/005075 A1 | 1/2003 | |
| WO | WO 2005/052650 A2 | 6/2005 | |
| WO | WO 2005/106601 A2 | 11/2005 | |
| WO | WO 2005105473 | 11/2005 | |
| WO | WO 2005105474 | 11/2005 | |
| WO | WO 2005105475 | 11/2005 | |
| WO | WO 2005108106 | 11/2005 | |
| WO | WO 2005108108 | 11/2005 | |
| WO | WO 2005108110 | 11/2005 | |
| WO | WO 2006005434 | 1/2006 | |
| WO | WO 2006015733 | 2/2006 | |
| WO | WO 2006018171 | 2/2006 | |
| WO | WO 2006018172 | 2/2006 | |
| WO | WO 2006/029745 A1 | 3/2006 | |
| WO | WO 2006040069 | 4/2006 | |
| WO | WO 2006056342 | 6/2006 | |
| WO | WO 2006072380 | 7/2006 | |
| WO | WO 2006/087138 A1 | 8/2006 | |
| WO | WO 2006087138 | 8/2006 | |
| WO | WO 2006099971 | 9/2006 | |
| WO | WO 2006119896 | 11/2006 | |
| WO | WO 2006128607 | 12/2006 | |
| WO | WO 2007/007793 A1 | 1/2007 | |
| WO | WO 2007006445 | 1/2007 | |
| WO | WO 2007006455 | 1/2007 | |
| WO | WO 2007/030530 A2 | 3/2007 | |
| WO | WO 2007/076952 A2 | 7/2007 | |
| WO | WO 2007076952 | 7/2007 | |
| WO | WO 2007079851 | 7/2007 | |
| WO | WO 2007/087984 A1 | 8/2007 | |
| WO | WO 2007115648 | 10/2007 | |
| WO | WO 2007/131765 A2 | 11/2007 | |
| WO | WO 2008/000350 | 1/2008 | |
| WO | WO 2008/000350 A1 | 1/2008 | |
| WO | WO 2008/000351 | 1/2008 | |
| WO | WO 2008/000351 A2 | 1/2008 | |
| WO | WO 2008/049533 | 5/2008 | |
| WO | WO 2008/061636 | 5/2008 | |
| WO | WO 2008/071325 | 6/2008 | |
| WO | WO 2009/000527 | 12/2008 | |
| WO | WO 2009/000528 | 12/2008 | |
| WO | WO 2009/000528 A1 | 12/2008 | |
| WO | WO 2009/000529 | 12/2008 | |
| WO | WO 2009/000529 A2 | 12/2008 | |
| WO | WO 2009/000530 | 12/2008 | |
| WO | WO 2009/012893 | 1/2009 | |
| WO | WO 2009/024265 | 2/2009 | |
| WO | WO 2009/080262 | 7/2009 | |
| WO | WO 2009/080263 | 7/2009 | |
| WO | WO 2009/083146 | 7/2009 | |
| WO | WO 2009/083151 | 7/2009 | |
| WO | WO 2009/100831 | 8/2009 | |
| WO | WO 2009/100869 | 8/2009 | |
| WO | WO 2009/109291 | 9/2009 | |
| WO | WO 2009/121578 | 10/2009 | |
| WO | WO 2009/149831 | 12/2009 | |
| WO | WO 2009/149833 | 12/2009 | |
| WO | WO 2009/156079 | 12/2009 | |
| WO | WO 2010/000470 | 1/2010 | |
| WO | WO 2010/003646 | 1/2010 | |
| WO | WO 2010/028739 | 3/2010 | |
| WO | WO 2011/012281 | 2/2011 | |
| WO | WO 2011/032665 | 3/2011 | |
| WO | WO 2011/032671 | 3/2011 | |

(56) References Cited

FOREIGN PATENT DOCUMENTS

OTHER PUBLICATIONS

German Search Report, German Patent Application No. DE 102007029204, Aug. 21, 2007, 4 pages.
German Search Report, German Patent Application No. DE 102007029203, Aug. 23, 2007, 4 pages.
Hutley M.C. et al., The moiré magnifier, Pure Appl. Opt. 3:133-142, 1994.
Kamal H. et al., Properties of moiré magnifiers, Optical Engineering 37(11):3007-3014, Nov. 1998.
Lippmann M. G., Epreuves reversibles—Photographies integrales, Comptes Rendues Acad. Sci. Paris 146:446-451, 1908 (in French).
International Search Report, International Application No. PCT/EP2008/005173, Dec. 15, 2008, 3 pages.
International Preliminary Report on Patentability, International Application No. PCT/EP2008/005173, Corrected Version, English Translation, Mar. 22, 2010, 6 pages.
International Search Report, International Application No. PCT/EP2008/005172, Nov. 21, 2008, 2 pages.
International Preliminary Report on Patentability, International Application No. PCT/EP2008/005172, English Translation, Apr. 1, 2010, 5 pages.
International Search Report, International Application No. PCT/EP2008/005174, Feb. 16, 2009, 3 pages.
International Preliminary Report on Patentability, International Application No. PCT/EP2008/005174, English Translation, Mar. 1, 2010, 7 pages.
International Search Report, International Application No. PCT/EP2008/005171, Nov. 21, 2008, 2 pages.
International Preliminary Report on Patentability, International Application No. PCT/EP2008/005171, English Translation, Mar. 29, 2010, 4 pages.
International Search Report, International Application No. PCT/EP2009/004326, Oct. 19, 2009, 3 pages.
International Preliminary Report on Patentability, International Application No. PCT/EP2009/004326, English Translation, Mar. 22, 2011, 5 pages.
International Search Report, International Application No. PCT/EP2009/005987, Jan. 27, 2010, 3 pages.
International Preliminary Report on Patentability, International Application No. PCT/EP2009/005987, English Translation, May 4, 2011, 5 pages.
Rahm, Michael, Modulo mapping—Novel Method to Arrange Microstructures for Moiré Magnifier Type Security Features, Abstract, Session 5: Optically Variable Security I, Jan. 22, 2010, Optical Document Security II, The 2010 Conference on Optical Security and Counterfeit Deterrence, Jan. 20-22, 2010, San Francisco, p. 1-5.
Rauscher W. et al., Novel method to arrange microstructures for moiré magnifier type security features, Optical Document Security II, San Francisco, Jan. 20-22, 2010, pp. 1-11.
Lippmann M. G., Epreuves reversibles—Reversible Prints, Integral Photographs, Academy of the Sciences, Mar. 2, 1908 session, English translation by Fredo Durand, 4 pages.
Dunn et al. (2004), "Three-Dimensional Virtual Images for Security Applications," Optical Security and Counterfeit Deterrence Techniques, SPIE vol. 5310, pp. 328-336.
Muke (2004), "Embossing of Optical Document Security Devices," Optical Security and Counterfeit Deterrence Techniques, SPIE vol. 5310, pp. 341-349.
Statement of Grounds and Particulars dated Jan. 2, 2014, filed by a third party in relation to Australian Patent Application No. 2008267366.
van Renesse, Ed. (1998), "Optical Document Security", $2^{nd}$ Ed, Three-Dimensional Tilt Images, Artech House, pp. 207-210.
van Renesse, Ed. (2005), "Optical Document Security", 3rd Ed, Scrambled Images, Artech House, pp. 161-166.
First Declaration of David Matthew Temple dated Apr. 1, 2014, and Exhibits "MDT-1", "MDT-2", and "MDT-3" in the matter of Australian Patent Application No. 2008267366 and opposition thereto by a third party.
Second Declaration of David Matthew Temple dated Jun. 1, 2014, in the matter of Australian Patent Application No. 2008267366 and opposition thereto by a third party.
Declaration of Bruce Alfred Hardwick dated Apr. 1, 2014, and Exhibits "BAH-1"- "BAH-12" in the matter of Australian Patent Application No. 2008267366 and opposition thereto by a third party.
Roberts (2010), "History of Lenticular and Related Autostereoscopic Methods"; from website http://www.outeraspect.com/history_lenticular.php.

REPRESENTATION SYSTEM

CROSS-REFERENCE TO RELATED APPLICATIONS

This application is the U.S. National Stage of International Application No. PCT/EP2008/005172, filed Jun. 25, 2008, which claims the benefit of German Patent Application DE 10 2007 029 203.3, filed Jun. 25, 2007; both of which are hereby incorporated by reference to the extent not inconsistent with the disclosure herewith.

The present invention relates to a depiction arrangement for security papers, value documents, electronic display devices or other data carriers for depicting one or more planar target image(s).

For protection, data carriers, such as value or identification documents, but also other valuable articles, such as branded articles, are often provided with security elements that permit the authenticity of the data carrier to be verified, and that simultaneously serve as protection against unauthorized reproduction. Data carriers within the meaning of the present invention include especially banknotes, stocks, bonds, certificates, vouchers, checks, valuable admission tickets and other papers that are at risk of counterfeiting, such as passports and other identity documents, credit cards, health cards, as well as product protection elements, such as labels, seals, packaging and the like. In the following, the term "data carrier" encompasses all such articles, documents and product protection means.

The security elements can be developed, for example, in the form of a security thread embedded in a banknote, a tear strip for product packaging, an applied security strip, a cover foil for a banknote having a through opening, or a self-supporting transfer element, such as a patch or a label that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanopatterns, such as with conventional embossed holograms or other hologram-like diffraction patterns, as are described, for example, in publications EP 0 330 733 A1 and EP 0 064 067 A1.

From publication U.S. Pat. No. 5,712,731 A is known the use of a moiré magnification arrangement as a security feature. The security device described there exhibits a regular arrangement of substantially identical printed microimages having a size up to 250 μm, and a regular two-dimensional arrangement of substantially identical spherical microlenses. Here, the microlens arrangement exhibits substantially the same division as the microimage arrangement. If the microimage arrangement is viewed through the microlens arrangement, then one or more magnified versions of the microimages are produced for the viewer in the regions in which the two arrangements are substantially in register.

The fundamental operating principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid comprised of identical image objects is viewed through a lens grid having approximately the same grid dimension. As with every pair of similar grids, a moiré pattern results that, in this case, appears as a magnified and, if applicable, rotated image of the repeated elements of the image grid.

Based on that, it is the object of the present invention to avoid the disadvantages of the background art and especially to specify a depiction arrangement that offers great freedom in the design of the motif images to be viewed.

This object is solved by the depiction arrangement having the features of the independent claims. Methods for manufacturing such depiction arrangements, a security paper and a data carrier having such depiction arrangements are specified in the coordinated claims. Developments of the present invention are the subject of the dependent claims.

According to a first aspect of the present invention, a generic depiction arrangement includes a raster image arrangement for depicting a specified planar target image that is given by an image function f(x,y), having a motif image that is subdivided into a plurality of cells, in each of which are arranged imaged regions of the target image, a viewing grid composed of a plurality of viewing elements for reconstructing the target image when the motif image is viewed with the aid of the viewing grid, the motif image exhibiting, with its subdivision into a plurality of cells, an image function m(x,y) that is given by $$m(x, y) = f\left(\begin{pmatrix} x \\ y \end{pmatrix} + (A(x, y) - I) \cdot \right.$$

$$\left. \left(\left(\left(\begin{pmatrix} x \\ y \end{pmatrix} + w_d(x, y)\right) \bmod W\right) - w_d(x, y) - w_c(x, y)\right)\right) \cdot g(x, y)$$

where $$w_d(x, y) = W \cdot \begin{pmatrix} d_1(x, y) \\ d_2(x, y) \end{pmatrix} \text{ and } w_c(x, y) = W \cdot \begin{pmatrix} c_1(x, y) \\ c_2(x, y) \end{pmatrix}$$

wherein the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the matrix $$A(x, y) = \begin{pmatrix} a_{11}(x, y) & a_{12}(x, y) \\ a_{21}(x, y) & a_{22}(x, y) \end{pmatrix}$$

describes a desired magnification and movement behavior of the depicted target image, the vector $(c_1(x,y), c_2(x,y))$, where $0 \le c_1(x,y), c_2(x,y) < 1$, indicates the relative position of the center of the viewing elements within the cells of the motif image, the vector $(d_1(x,y), d_2(x,y))$, where $0 \le d_1(x, y), d_2(x, y) < 1$, represents a location-dependent displacement of the cell boundaries in the motif image, and g(x,y) is a mask function for adjusting the visibility of the target image.

In the context of this description, as far as possible, scalars and vectors are referred to with small letters and matrices with capital letters. To improve clarity, arrow symbols for marking vectors are dispensed with.

The depiction arrangement according to the present invention comprises a raster image arrangement in which a motif (the target image) appears to float, individually and not necessarily as an array, in front of or behind the image plane. Upon tilting the security element formed by the stacked motif image and the viewing grid, the target image moves in directions specified by the magnification and movement matrix A. The motif image is not produced photographically, and also not by exposure through an exposure grid, but rather is constructed mathematically with a modulo algorithm wherein a plurality of different magnification and movement effects can be produced that are described in greater detail below.

In the known moiré magnifier mentioned above, the image to be depicted consists of individual motifs that are arranged periodically in a lattice. The motif image to be viewed through the lenses constitutes a greatly scaled down version of the image to be depicted, the area allocated to each individual motif corresponding to a maximum of about one lens cell. Due to the smallness of the lens cells, only relatively simple figures may be considered as individual motifs. In contrast to this, the target image in the "modulo mapping" described here is generally an individual image, it need not necessarily be composed of a lattice of periodically repeated individual motifs. The target image can constitute a complex individual image having a high resolution.

In the following, the name component "moiré" is used for embodiments in which the moiré effect is involved; when the name component "modulo" is used, a moiré effect is not necessarily involved. The name component "mapping" indicates arbitrary mappings, while the name component "magnifier" indicates that, not arbitrary mappings, but rather only magnifications are involved.

All variants described below can be embodied having two-dimensional lens grids in lattice arrangements of arbitrary low or high symmetry or in cylindrical lens arrangements. All arrangements can also be calculated for curved surfaces, as basically described in publication WO 2007/076952 A2, the disclosure of which is incorporated herein by reference.

In a preferred embodiment, the viewing elements of the viewing grid are arranged periodically or locally periodically, the local period parameters in the latter case preferably changing only slowly in relation to the periodicity length. Here, the periodicity length or the local periodicity length is especially between 3 µm and 50 µm, preferably between 5 µm and 30 µm, particularly preferably between about 10 µm and about 20 µm. Also an abrupt change in the periodicity length is possible if it was previously kept constant or nearly constant over a segment that is large compared with the periodicity length, for example for more than 20, 50 or 100 periodicity lengths.

The viewing elements can be formed by non-cylindrical microlenses or concave microreflectors, especially by microlenses or concave microreflectors having a circular or polygonally delimited base area, or also by elongated cylindrical lenses or concave cylindrical reflectors whose dimension in the longitudinal direction is more than 250 µm, preferably more than 300 µm, particularly preferably more than 500 µm and especially more than 1 mm. In further preferred variants of the present invention, the viewing elements are formed by circular apertures, slit apertures, circular or slit apertures provided with reflectors, aspherical lenses, Fresnel lenses, GRIN (Gradient Refractive Index) lenses, zone plates, holographic lenses, concave reflectors, Fresnel reflectors, zone reflectors or other elements having a focusing or also masking effect.

In a preferred embodiment, it is provided that the support of the image function $$f\left((A-I)\cdot\begin{pmatrix}x\\y\end{pmatrix}\right)$$

is greater than the unit cell of the viewing grid W. Here, the support of a function denotes, in the usual manner, the closure of the set in which the function is not zero.

In advantageous embodiments, the depicted target image exhibits no periodicity, in other words, is a depiction of an individual motif. If, in other embodiments, the target image is periodic, then it preferably exhibits a periodicity that is described by a 2×2 matrix P, wherein the periodicity unit cell is not equal to (A-I) W.

In an advantageous variant of the present invention, the viewing grid and the motif image of the depiction arrangement are firmly joined together and, in this way, form a security element having a stacked, spaced-apart viewing grid and motif image. The motif image and the viewing grid are advantageously arranged at opposing surfaces of an optical spacing layer. The security element can especially be a security thread, a tear strip, a security band, a security strip, a patch or a label for application to a security paper, value document or the like. The total thickness of the security element is especially below 50 µm, preferably below 30 µm and particularly preferably below 20 µm.

According to another, likewise advantageous variant of the present invention, the viewing grid and the motif image of the depiction arrangement are arranged at different positions of a data carrier such that the viewing grid and the motif image are stackable for self-authentication, and form a security element in the stacked state. The viewing grid and the motif image are especially stackable by bending, creasing, buckling or folding the data carrier.

According to a further, likewise advantageous variant of the present invention, the motif image is displayed by an electronic display device and the viewing grid is firmly joined with the electronic display device for viewing the displayed motif image. Instead of being firmly joined with the electronic display device, the viewing grid can also be a separate viewing grid that is bringable onto or in front of the electronic display device for viewing the displayed motif image.

In the context of this description, the security element can thus be formed both by a viewing grid and motif image that are firmly joined together, as a permanent security element, and by a viewing grid that exists spatially separately and an associated motif image, the two elements forming, upon stacking, a security element that exists temporarily. In the following, statements about the movement behavior or the visual impression of the security element refer both to firmly joined permanent security elements and to temporary security elements formed by stacking.

In an advantageous variant of the present invention, it is provided that the magnification and movement matrix A is given by $$A = \begin{pmatrix} a_{11} & a_{12} \\ a_{21} & a_{22} \end{pmatrix} = \begin{pmatrix} v_1 \cdot \cos\phi_1 & v_2 \cdot \cos\phi_2 \\ v_1 \cdot \sin\phi_1 & v_2 \cdot \sin\phi_2 \end{pmatrix}$$

such that the depicted target image, upon tilting the security element horizontally about a vertical axis, moves with a speed $v_1$ in the direction $\phi_1$ in relation to the x-axis, and upon tilting vertically about a horizontal axis, moves with the speed $v_2$ in the direction $\phi_2$ in relation to the x-axis. Here, advantageously, $\phi_1$ is not equal to 0° and is not equal to 180° and/or $\phi_2$ is not equal to 90° and is not equal to −90° and/or $v_1$ is not equal to $v_2$.

In an advantageous embodiment of this variant of the present invention, irrespective of the tilt direction, the target image always moves in the same direction upon tilting the security element.

In a further advantageous variant of the present invention, it is provided that, in the magnification and movement matrix, $a_{11}=z_1/e$ and $a_{22}=z_2/e$, where e denotes the effective distance of the viewing grid from the motif image such that, upon viewing with the eye separation being in the x-direction, the target image is visible at a depth or height $z_1$, and when the arrangement, rotated by 90°, is viewed with the eye separation being in the y-direction, is visible at a depth or height $z_2$. The lens data and the refractive index of the medium between the lens grid and the motif grid are taken into account in the effective distance e of the viewing grid from the motif image.

In particular, it can even be provided that the magnification and movement matrix A is given by $$A = \begin{pmatrix} \frac{z_1}{e} & \frac{z_2}{e} \cdot \cot\phi_2 \\ \frac{z_1}{e} \cdot \tan\phi_1 & \frac{z_2}{e} \end{pmatrix}$$

such that
  upon viewing with the eye separation being in the x-direction, the target image is visible at a depth or height $z_1$ and, upon tilting the arrangement horizontally or upon a horizontal change in the viewing direction, moves in the direction $\phi_1$ in relation to the x-axis, and
  when the arrangement, rotated by 90°, is viewed with the eye separation being in the y-direction, the target image is visible at a depth or height $z_2$ and, upon tilting the arrangement vertically or upon a vertical change in the viewing direction, moves in the direction $\phi_2$ in relation to the x-axis.

In advantageous embodiments, the magnification and movement matrix A is location independent. In this case, it describes a linear image such that the plurality of cells of the motif image each include linearly imaged regions of the target image. In particular, however, in the inventive variants just described, it can also be provided that one or more of the magnifications $z_1$, $z_2$ and the movement directions $\phi_1$, $\phi_2$ are location dependent, in other words, are represented in the form $z_1(x,y)$, $z_2(x,y)$, $\phi_1(x,y)$ or $\phi_2(x,y)$. In this case, also the magnification and movement matrix A is location dependent.

In an advantageous embodiment, the viewing grid is a slot grid or cylindrical lens grid whose unit cell is given, for example, by $$W = \begin{pmatrix} d & 0 \\ 0 & \infty \end{pmatrix}$$

where d is the slot or cylinder axis distance. In this case, the magnification and movement matrix A is given by $$A = \begin{pmatrix} a_{11} & 0 \\ a_{21} & 1 \end{pmatrix} = \begin{pmatrix} v_1 \cdot \cos\phi_1 & 0 \\ v_1 \cdot \sin\phi_1 & 1 \end{pmatrix} = \begin{pmatrix} \frac{z_1}{e} & 0 \\ \frac{z_1}{e} \cdot \tan\phi_1 & 1 \end{pmatrix}$$

where $\phi_1$ is a prechosen movement direction.

The pattern produced herewith for the print or embossing image to be disposed behind a lens grid W can be viewed not only with the slot aperture array or cylindrical lens array $$W = \begin{pmatrix} d & 0 \\ 0 & \infty \end{pmatrix},$$

but also with a circular aperture array or lens array, where $$W = \begin{pmatrix} d & 0 \\ d \cdot \tan\beta & d_2 \end{pmatrix},$$

$d_2, \beta$ being arbitrary.

In a cylindrical lens axis in an arbitrary direction $\gamma$ and having an axis distance d, in other words a lens grid $$W = \begin{pmatrix} \cos\gamma & -\sin\gamma \\ \sin\gamma & \cos\gamma \end{pmatrix} \cdot \begin{pmatrix} d & 0 \\ 0 & \infty \end{pmatrix}$$

the suitable matrix is A, in which no magnification or distortion is present in the direction $\gamma$:

$$A = \begin{pmatrix} \cos\gamma & -\sin\gamma \\ \sin\gamma & \cos\gamma \end{pmatrix} \cdot \begin{pmatrix} a_{11} & 0 \\ a_{21} & 1 \end{pmatrix} \cdot \begin{pmatrix} \cos\gamma & \sin\gamma \\ -\sin\gamma & \cos\gamma \end{pmatrix}$$

The pattern produced herewith for the print or embossing image to be disposed behind a lens grid W can be viewed not only with the slot aperture array or cylindrical lens array having the axis in the direction $\gamma$, but also with a circular aperture array or lens array, where $$W = \begin{pmatrix} \cos\gamma & -\sin\gamma \\ \sin\gamma & \cos\gamma \end{pmatrix} \cdot \begin{pmatrix} d & 0 \\ d \cdot \tan\beta & d_2 \end{pmatrix},$$

$d_2, \beta$ being arbitrary.

Further, in advantageous embodiments, the cell boundaries in the motif image are location-independently displaced such that the vector $(d_1(x,y), d_2(x,y))$ occurring in the image function $m(x,y)$ is constant. Alternatively, the cell boundaries in the motif image can also be location-dependently displaced. In particular, the motif image can exhibit two or more subregions having a different, in each case constant, cell grid.

A location-dependent vector $(d_1(x,y), d_2(x,y))$ can also be used to define the contour shape of the cells in the motif image. For example, instead of parallelogram-shaped cells, also cells having another uniform shape can be used that match one another such that the area of the motif image is gaplessly filled (parqueting the area of the motif image). It is possible to define the cell shape as desired through the choice of the location-dependent vector ($d_1(x,y)$, $d_2(x,y)$). In this way, the designer especially influences the viewing angles at which motif jumps occur.

The motif image can also be broken down into different regions in which the cells each exhibit an identical shape, while the cell shapes differ in the different regions. This causes, upon tilting the security element, portions of the motif that are allocated to different regions to jump at different tilt angles. If the regions having different cells are large enough that they are perceptible with the naked eye, then in this way, an additional, visible piece of information can be accommodated in the security element. If, in contrast, the regions are microscopic, in other words perceptible only with magnifying auxiliary means, then in this way, an additional, hidden piece of information that can serve as a higher-level security feature can be accommodated in the security element.

Further, a location-dependent vector ($d_1(x,y)$, $d_2(x,y)$) can also be used to produce cells that all differ from one another with respect to their shape. In this way, it is possible to produce an entirely individual security feature that can be checked, for example, by means of a microscope.

In many cases, the mask function g that occurs in the image function $m(x,y)$ is advantageously identical to 1. In other, likewise advantageous designs, the mask function g is zero in subregions, especially in edge regions of the cells of the motif image, and then limits the solid angle range at which the target image is visible. In addition to an angle limit, the mask function can, as an image field limit, also define regions in which the target image does not become visible. In this case, the regions in which g=0 can extend across a plurality of cells. For example, the embodiments cited in example 16 having images placed adjacent to one another can be described by such macroscopic mask functions. Generally, a mask function for limiting the image field is given by $$g\begin{pmatrix} x \\ y \end{pmatrix} = \begin{bmatrix} 1 & \text{in regions in which the target image is to be visible} \\ 0 & \text{in regions in which the target image is not to be visible} \end{bmatrix}$$

In advantageous embodiments, it is provided that the relative position of the center of the viewing elements is location independent within the cells of the motif image, in other words, the vector ($c_1(x,y)$, $c_2(x,y)$) is constant. In some designs, however, it can also be appropriate to design the relative position of the center of the viewing elements to be location dependent within the cells of the motif image, as explained in greater detail below.

In the first aspect of the present invention, the raster image arrangement of the depiction arrangement always depicts an individual target image. In its second aspect, the present invention comprises designs in which multiple target images are depicted simultaneously or in alternation. Such a depiction arrangement then comprises a raster image arrangement for depicting a plurality of planar target images that are given by image functions $f_i(x,y)$, i=1, 2, ... n, where n≥1, having
- a motif image that is subdivided into a plurality of cells, in each of which are arranged imaged regions of the target images,
- a viewing grid composed of a plurality of viewing elements for reconstructing the target images when the motif image is viewed with the aid of the viewing grid, the motif image exhibiting, with its subdivision into a plurality of cells, an image function $m(x,y)$ that is given by $m(x,y)=F(h_1, h_2, \ldots h_n)$, having the describing functions $$h_i(x, y) = f_i\left(\begin{pmatrix} x \\ y \end{pmatrix}\right) + (A_i(x, y) - I) \cdot$$

$$\left(\left(\left(\begin{pmatrix} x \\ y \end{pmatrix} + w_{di}(x, y)\right) \bmod W\right) - w_{di}(x, y) - w_{ci}(x, y)\right) \cdot g_i(x, y)$$

where $$w_{di}(x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix},$$

wherein $F(h_1, h_2, \ldots h_n)$ is a master function that indicates an operation on the n describing functions $h_i(x,y)$, the unit cell of the viewing grid is described by lattice cell vectors $w_1 = \begin{pmatrix} w_{11} \\ w_{21} \end{pmatrix}$ and $w_2 = \begin{pmatrix} w_{12} \\ w_{22} \end{pmatrix}$ and combined in the matrix $$W = \begin{pmatrix} w_{11} & w_{12} \\ w_{21} & w_{22} \end{pmatrix},$$

the matrices $$A_i(x, y) = \begin{pmatrix} a_{i11}(x, y) & a_{i12}(x, y) \\ a_{i21}(x, y) & a_{i22}(x, y) \end{pmatrix}$$

each describe a desired magnification and movement behavior for the target image $f_i$, the vectors ($c_{i1}(x,y)$, $c_{i2}(x,y)$), where $0 \leq c_{i1}(x,y)$, $c_{i2}(x,y) < 1$, indicate in each case, for the target image $f_i$, the relative position of the center of the viewing elements within the cells i of the motif image, the vectors ($d_{i1}(x,y)$, $d_{i2}(x,y)$), where $0 \leq d_{i1}(x,y)$, $d_{i2}(x,y) < 1$, each represent a location-dependent displacement of the cell boundaries in the motif image, and $g_i(x,y)$ are mask functions for adjusting the visibility of the target image $f_i$.

All explanations given for individual target images $f(x,y)$ in the first aspect of the present invention also apply to the target images $f_i(x,y)$ of the more general raster image arrangements of the second aspect of the present invention. In particular, at least one (or also all) of the describing functions $h_i(x,y)$ of the second aspect of the present invention can be designed as specified above for the image function $m(x,y)$ of the first aspect of the present invention.

The raster image arrangement advantageously depicts an alternating image, a motion image or a morph image. Here, the mask functions $g_i$ can especially define a strip-like or checkerboard-like alternation of the visibility of the target images $f_i$. Upon tilting, an image sequence can advantageously proceed along a specified direction; in this case, expediently, strip-like mask functions $g_i$ are used, in other words, mask functions that, for each i, are not equal to zero only in a strip that wanders within the unit cell. In the general case, however, also mask functions can be chosen that let an image sequence proceed through curved, meander-shaped or spiral-shaped tilt movements.

In many cases, it is appropriate for the master function F to constitute the sum function such that $$m(x, y) = F(h_1, h_2, \ldots h_n) = \sum_{i=1}^{n} (h_i(x, y)).$$

While, in alternating images (tilt images) or other motion images, ideally only one target image is visible simultaneously in each case, the present invention also includes designs in which two or more target images $f_i$ are simultaneously visible for the viewer. Here, the master function F advantageously constitutes the sum function, the maximum function, an OR function, an XOR function or another logic function.

In an advantageous development, n target objects $f_j(x,y)$ j=1, ... n are specified that each lie at an apparent depth $z_j$, where $z_j > z_{j-1}$, and, as the master function F, a modified minimum function is chosen through which, in the event that, at a position (x,y), the describing functions $h_j$ are not equal to zero for multiple j, the smallest j is selected.

Also in the second aspect of the present invention, the viewing grid and the motif image of the depiction arrangement can be firmly joined together to form a permanent security element, or the viewing grid and the motif image can be arranged at different positions of a data carrier to form a temporary security element by stacking. The statements made in the description of the first aspect of the present invention about permanent or temporary security elements also apply in the same way in the case of the second aspect of the present invention.

The motif image is especially present in an embossed or printed layer. According to an advantageous development of the present invention, the security element exhibits, in both aspects, an opaque cover layer to cover the raster image arrangement in some regions. Thus, within the covered region, no modulo magnification effect occurs, such that the optically variable effect can be combined with conventional pieces of information or with other effects. This cover layer is advantageously present in the form of patterns, characters or codes and/or exhibits gaps in the form of patterns, characters or codes.

If the motif image and the viewing grid are arranged at opposing surfaces of an optical spacing layer, the spacing layer can comprise, for example, a plastic foil and/or a lacquer layer.

The permanent security element itself preferably constitutes a security thread, a tear strip, a security band, a security strip, a patch or a label for application to a security paper, value document or the like. In an advantageous embodiment, the security element can span a transparent or uncovered region of a data carrier. Here, different appearances can be realized on different sides of the data carrier. Also two-sided designs can be used in which viewing grids are arranged on both sides of a motif image.

Further, as in the first aspect of the present invention, the motif image can advantageously be displayed by an electronic display device. Here, for viewing the displayed motif image, the viewing grid can be firmly joined with the electronic display device or can be a separate viewing grid that is bringable onto or in front of the electronic display device.

The raster image arrangements according to the present invention can be combined with other security features, for example with diffractive patterns, with hologram patterns in all embodiment variants, metalized or not metalized, with subwavelength patterns, metalized or not metalized, with subwavelength lattices, with layer systems that display a color shift upon tilting, semitransparent or opaque, with diffractive optical elements, with refractive optical elements, such as prism-type beam shapers, with special hole shapes, with security features having a specifically adjusted electrical conductivity, with incorporated substances having a magnetic code, with substances having a phosphorescent, fluorescent or luminescent effect, with security features based on liquid crystals, with matte patterns, with micromirrors, with elements having a blind effect, or with sawtooth patterns. Further security features with which the raster image arrangements according to the present invention can be combined are specified in publication WO 2005/052650 A2 on pages 71 to 73; these are incorporated herein by reference.

In both aspects of the present invention, the image contents of individual cells of the motif image can be interchanged according to the determination of the image function m(x,y).

The present invention also includes a method for manufacturing a depiction arrangement according to the first aspect of the present invention, in which is calculated, from a planar target image that is given by an image function f(x,y), a motif image that is subdivided into a plurality of cells, in each of which are arranged imaged regions of the target image. The motif image exhibits, with its subdivision into a plurality of cells, an image function m(x,y) that is calculated by $$m(x, y) = f\left(\binom{x}{y} + (A(x, y) - I) \cdot \right.$$
$$\left. \left(\left(\left(\binom{x}{y} + w_d(x, y)\right) \bmod W\right) - w_d(x, y) - w_c(x, y)\right)\right) \cdot g(x, y)$$

where $$w_d(x, y) = W \cdot \binom{d_1(x, y)}{d_2(x, y)} \text{ and } w_c(x, y) = W \cdot \binom{c_1(x, y)}{c_2(x, y)},$$

such that the target image is reconstructed upon viewing the motif image with the aid of the viewing grid. The variables occurring in the formula for m(x,y) are already defined or explained in greater detail above.

Further, the present invention provides a method for manufacturing a depiction arrangement according to the second aspect of the present invention, in which is calculated, from a plurality of planar target images that are given by image functions $f_i(x,y)$, i=1, 2, ... n, where n≥1, a motif image that is subdivided into a plurality of cells, in each of which are arranged imaged regions of the target image. The motif image exhibits, with its subdivision into a plurality of cells, an image function m(x,y) that is calculated by $m(x,y)=F(h_1, h_2, \ldots h_n)$, having the describing functions $$h_i(x, y) = f_i\left(\binom{x}{y} + (A_i(x, y) - I) \cdot \right.$$
$$\left. \left(\left(\left(\binom{x}{y} + w_{di}(x, y)\right) \bmod W\right) - w_{di}(x, y) - w_{ci}(x, y)\right)\right) \cdot g_i(x, y)$$

where

-continued $$w_{di}(x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix},$$

such that the target images are reconstructed upon viewing the motif image through the viewing grid. Here, too, is for the definition or more detailed explanation of the variables occurring in m(x,y), reference is made to the explanation given above.

Within the scope of the present invention, the size of the motif image elements and of the viewing elements is typically about 5 to 50 μm such that also the influence of the modulo magnification arrangement on the thickness of the security elements can be kept small. The manufacture of such small lens arrays and such small images is described, for example, in publication DE 10 2005 028162 A1, the disclosure of which is incorporated herein by reference.

A typical approach here is as follows: To manufacture micropatterns (microlenses, microimage elements), semiconductor patterning techniques can be used, for example photolithography or electron beam lithography. A particularly suitable method consists in exposing patterns with the aid of a focused laser beam in photoresist. Thereafter, the patterns, which can exhibit binary or more complex three-dimensional cross-section profiles, are exposed with a developer. As an alternative method, laser ablation can be used.

The original obtained in one of these ways can be further processed into an embossing die with whose aid the patterns can be replicated, for example by embossing in UV lacquer, thermoplastic embossing, or by the microintaglio technique described in publication WO 2008/00350 A1. The last-mentioned technique is a microintaglio technique that combines the advantages of printing and embossing technologies. Details of this microintaglio method and the advantages associated therewith are set forth in publication WO 2008/00350 A1, the disclosure of which is incorporated herein by reference.

An array of different embodiment variants are suitable for the end product: embossing patterns evaporated with metal, coloring through metallic nanopatterns, embossing in colored UV lacquer, microintaglio printing according to publication WO 2008/00350 A1, coloring the embossing patterns and subsequently squeegeeing the embossed foil, or also the method described in German patent application 10 2007 062 089.8 for selectively transferring an imprinting substance to elevations or depressions of an embossing pattern. Alternatively, the motif image can be written directly into a light-sensitive layer with a focused laser beam. The microlens array can likewise be manufactured by means of laser ablation or grayscale lithography. Alternatively, a binary exposure can occur, the lens shape first being created subsequently through plasticization of photoresist ("thermal reflow"). From the original—as in the case of the micropattern array—an embossing die can be produced with whose aid mass production can occur, for example through embossing in UV lacquer or thermoplastic embossing.

If the modulo magnifier principle or modulo mapping principle is applied in decorative articles (e.g. greeting cards, pictures as wall decoration, curtains, table covers, key rings, etc.) or in the decoration of products, then the size of the images and lenses to be introduced is about 50 to 1,000 μm. Here, the motif images to be introduced can be printed in color with conventional printing methods, such as offset printing, intaglio printing, relief printing, screen printing, or digital printing methods, such as inkjet printing or laser printing.

The modulo magnifier principle or modulo mapping principle according to the present invention can also be applied in three-dimensional-appearing computer and television images that are generally displayed on an electronic display device. In this case, the size of the images to be introduced and the size of the lenses in the lens array to be attached in front of the screen is about 50 to 500 μm. The screen resolution should be at least one order of magnitude better, such that high-resolution screens are required for this application.

Finally, the present invention also includes a security paper for manufacturing security or value documents, such as banknotes, checks, identification cards, certificates and the like, having a depiction arrangement of the kind described above. The present invention further includes a data carrier, especially a branded article, a value document, a decorative article, such as packaging, postcards or the like, having a depiction arrangement of the kind described above. Here, the viewing grid and/or the motif image of the depiction arrangement can be arranged contiguously, on sub-areas or in a window region of the data carrier.

The present invention also relates to an electronic display arrangement having an electronic display device, especially a computer or television screen, a control device and a depiction arrangement of the kind described above. Here, the control device is designed and adjusted to display the motif image of the depiction arrangement on the electronic display device. Here, the viewing grid for viewing the displayed motif image can be firmly joined with the electronic display device or can be a separate viewing grid that is bringable onto or in front of the electronic display device for viewing the displayed motif image.

Further exemplary embodiments and advantages of the present invention are described below with reference to the drawings. To improve clarity, a depiction to scale and proportion was dispensed with in the drawings.

Figure 2:
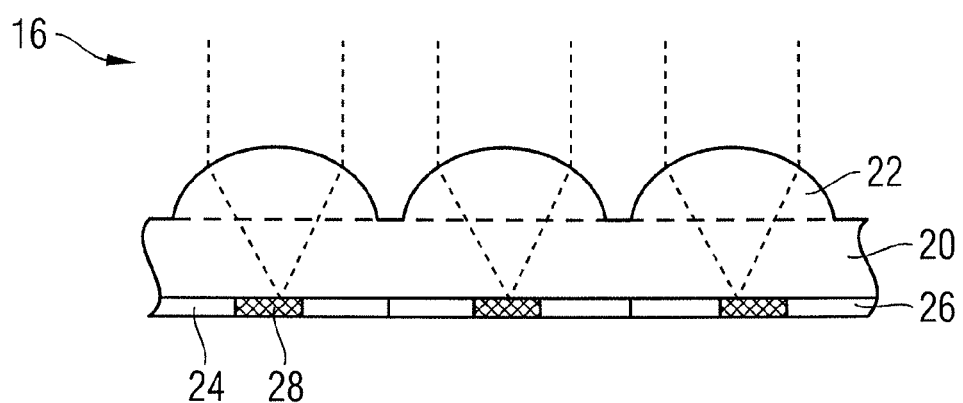
Figure 3:
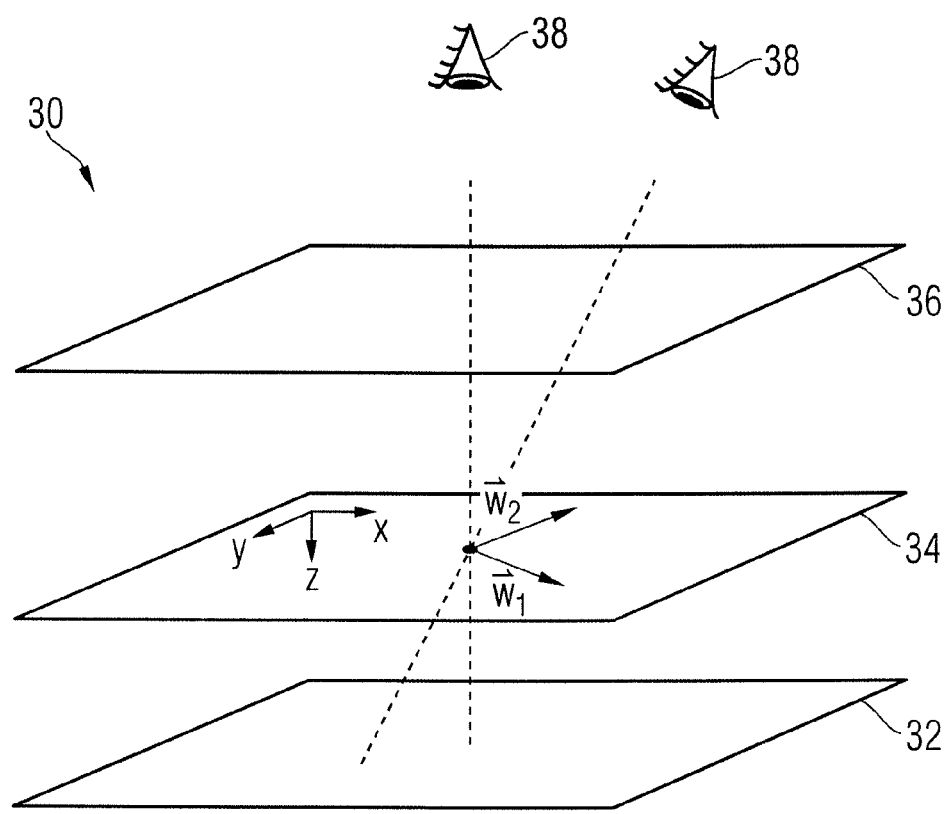
Figure 4A:
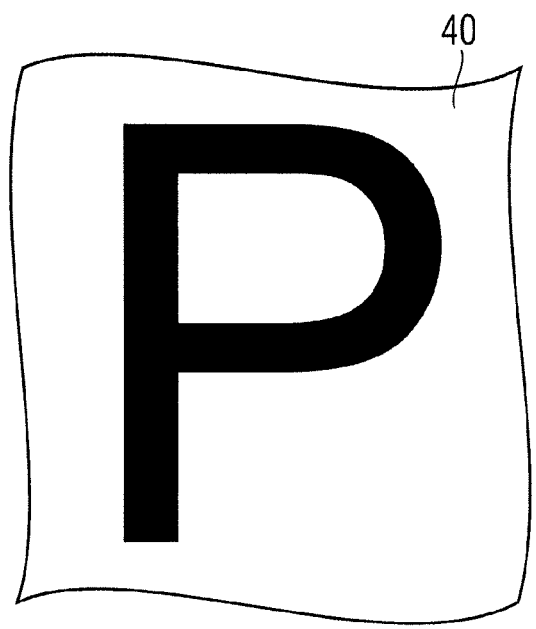
Figure 4B:
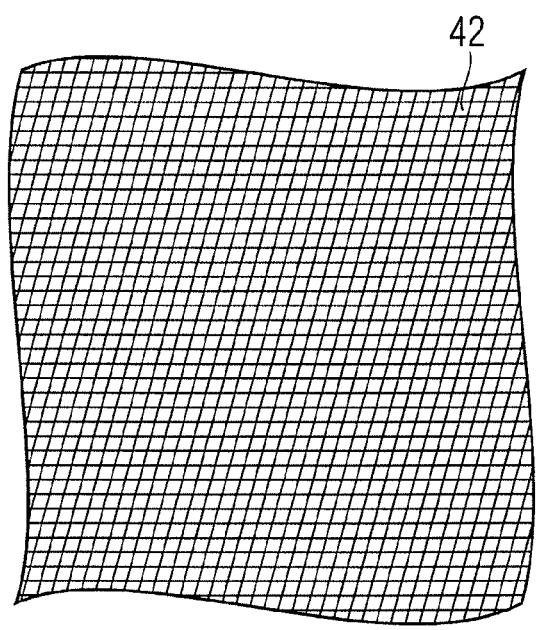
Figure 4C:
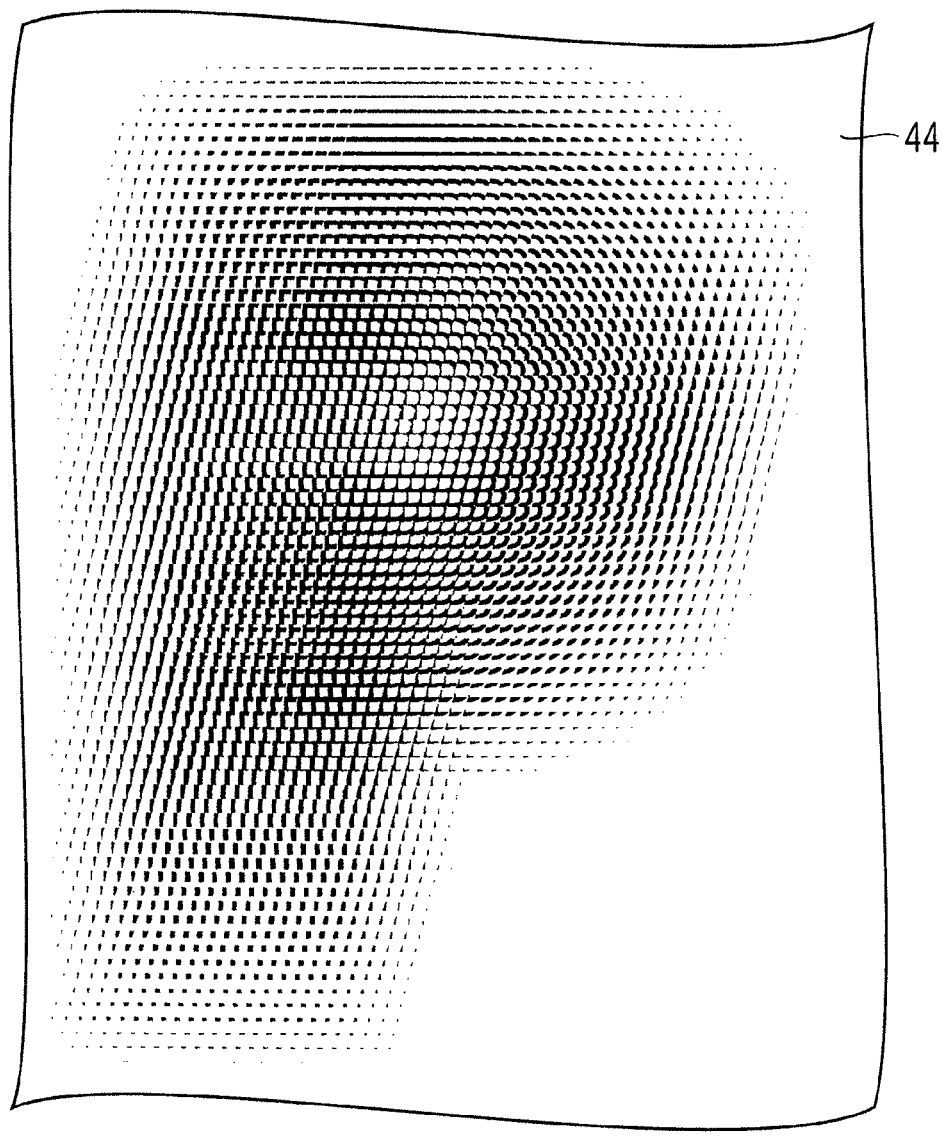
Figure 5A:
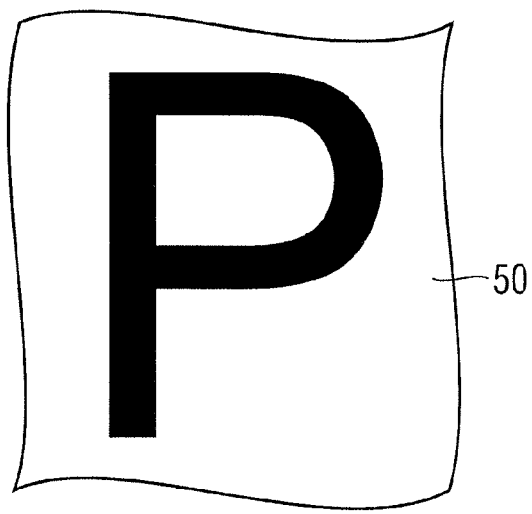
Figure 5B:
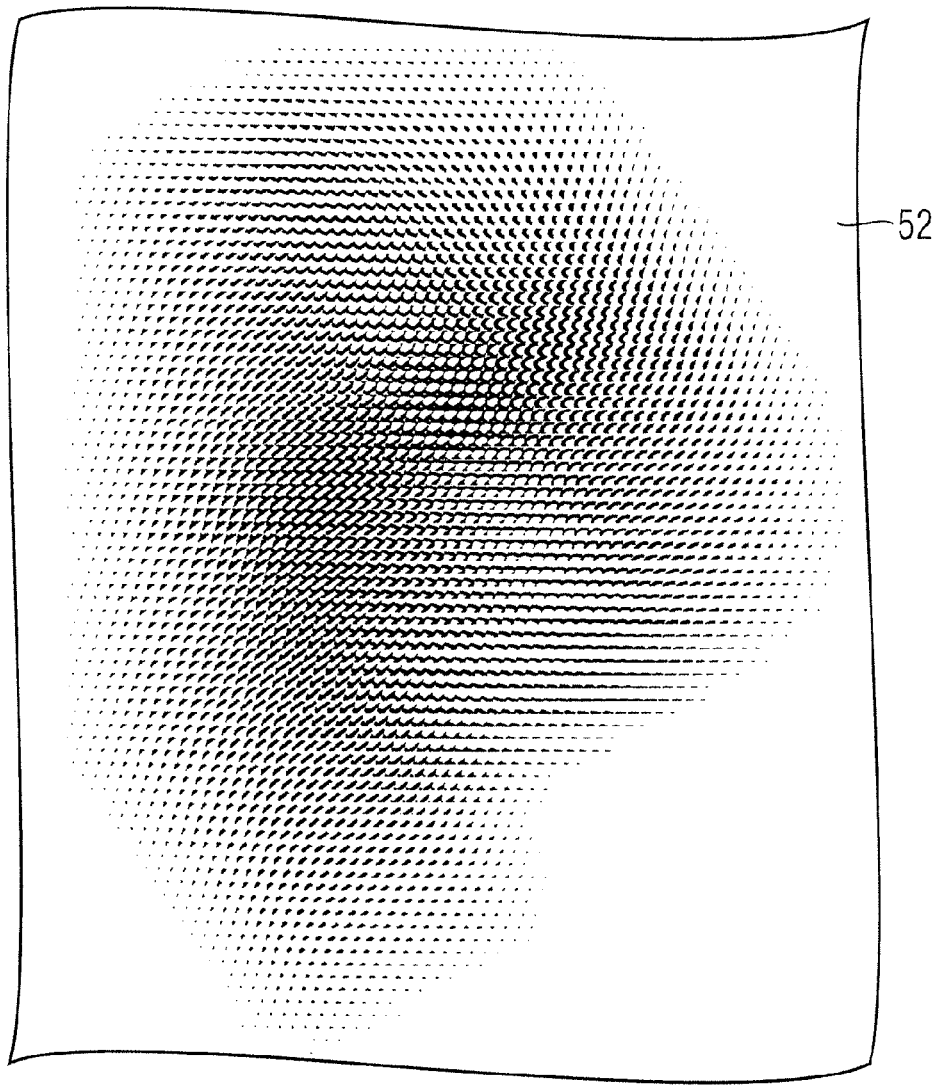
Figure 6A:
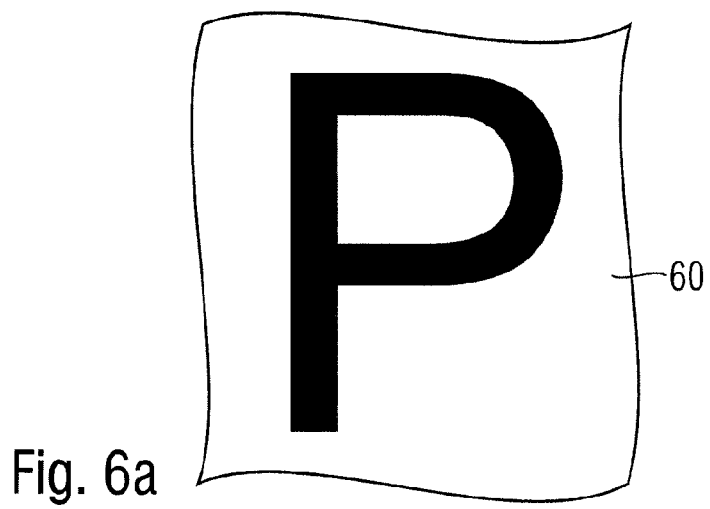
Figure 6B:
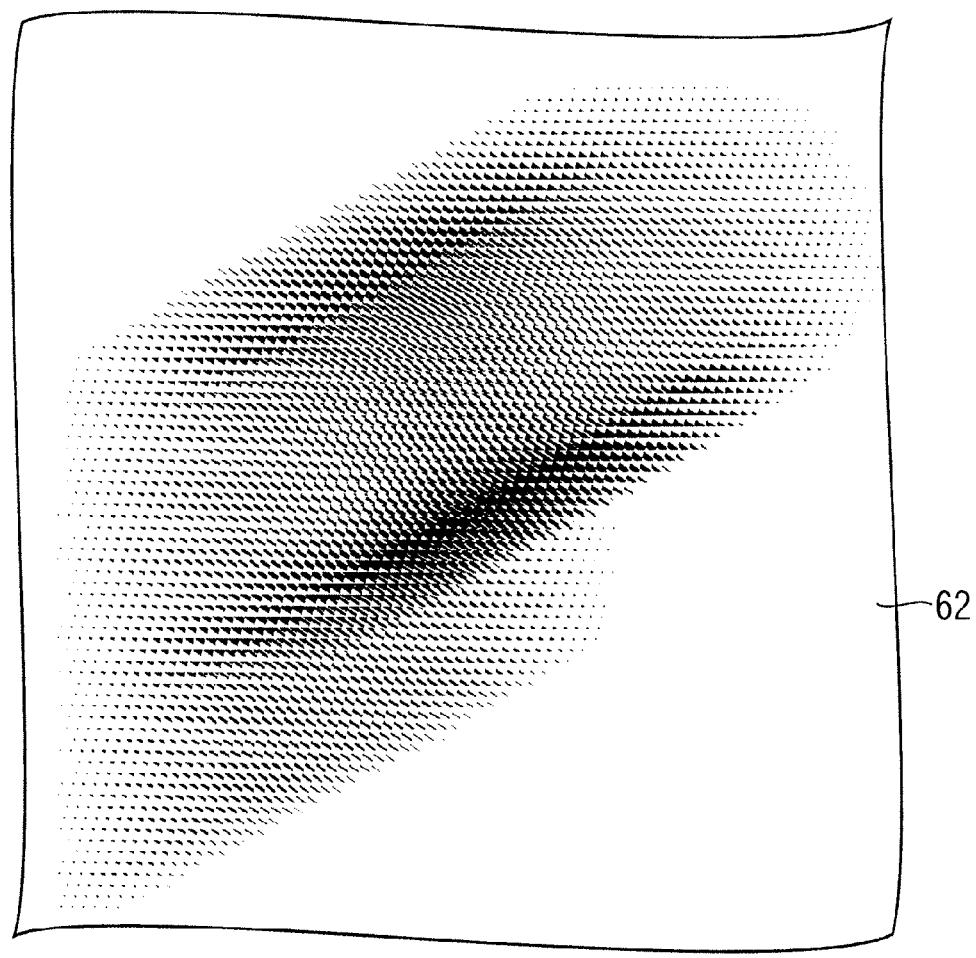
Figure 7A:
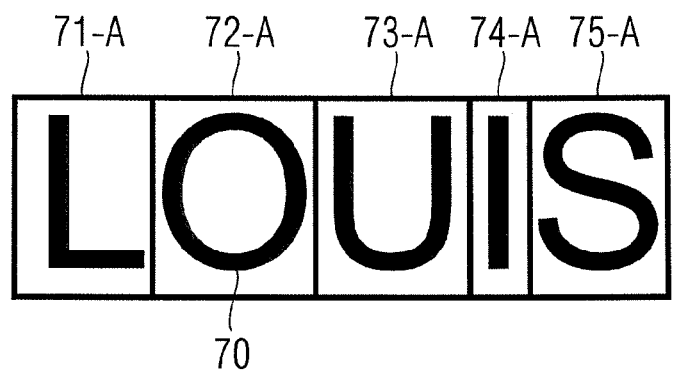
Figure 7B:
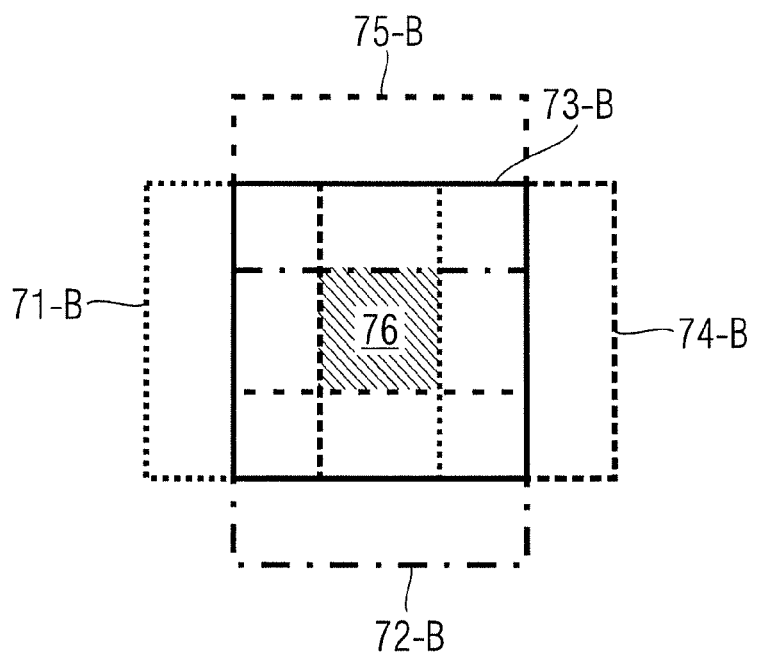
Figures 8A, 8B:
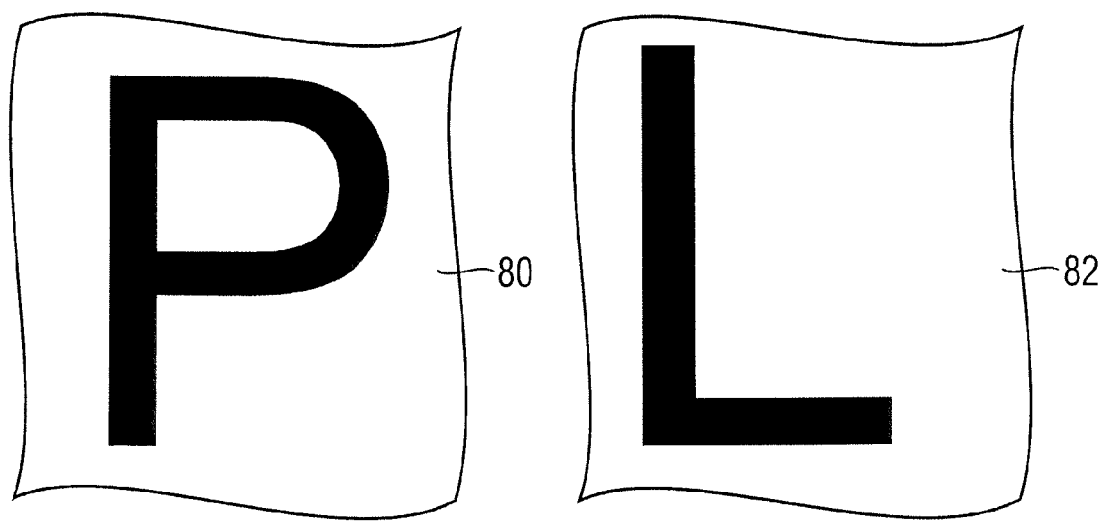
Figure 8C:
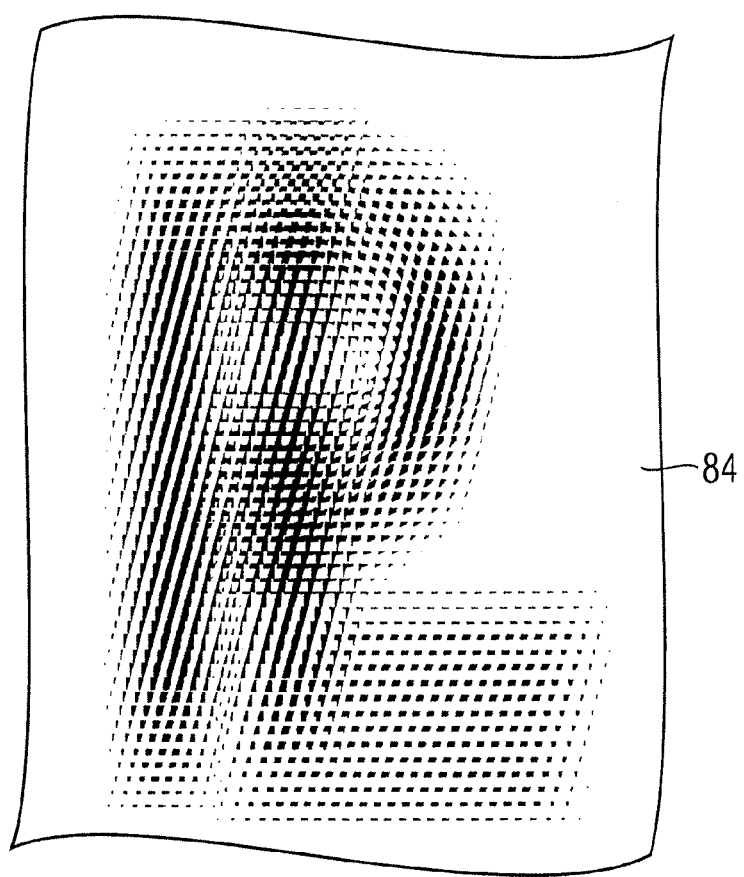
Figure 9A:
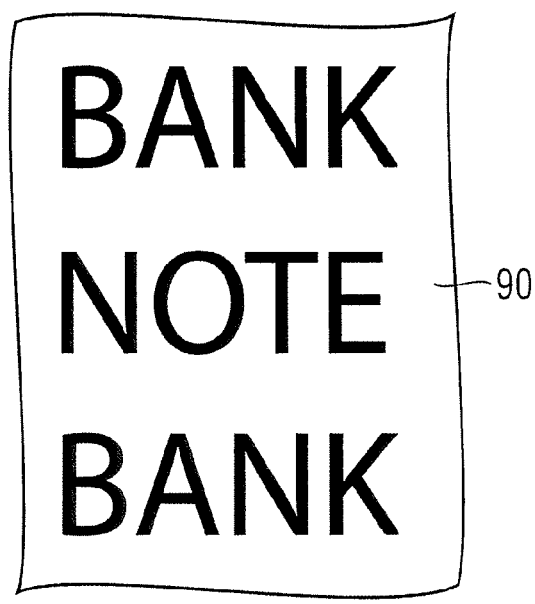
Figure 9B:
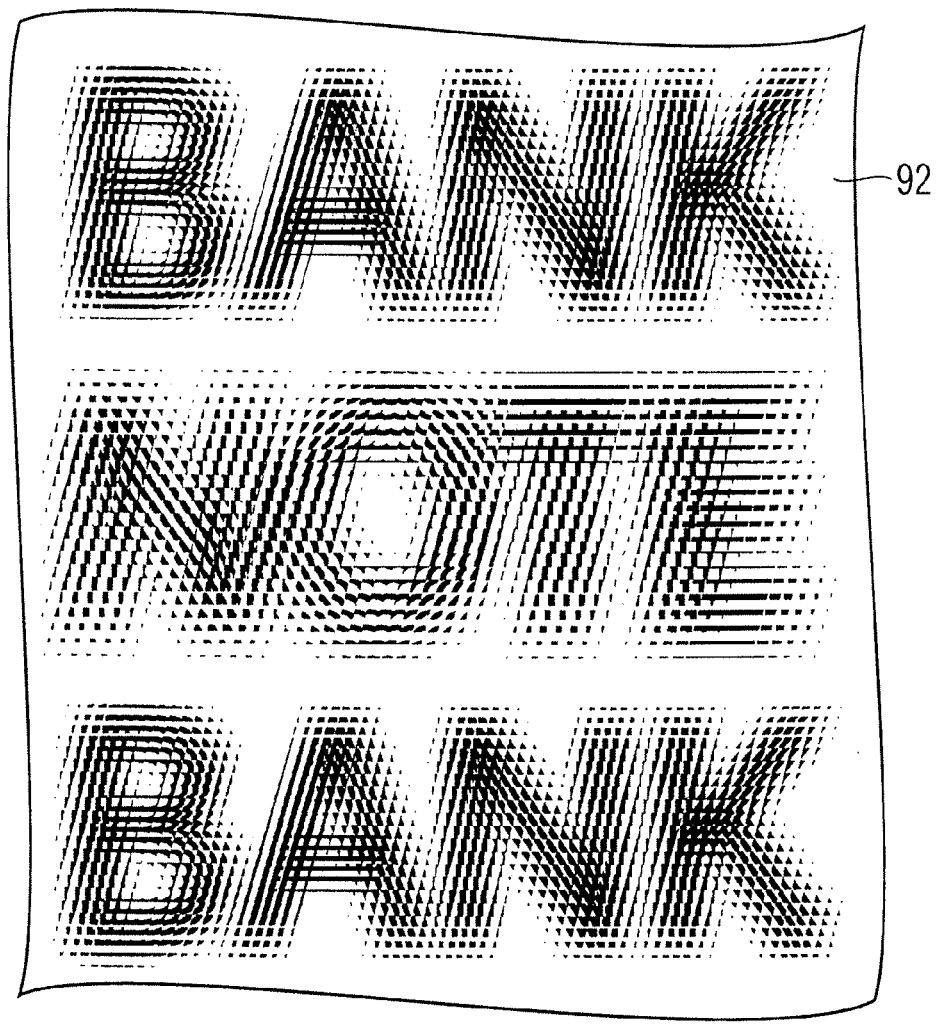
Figure 10A:
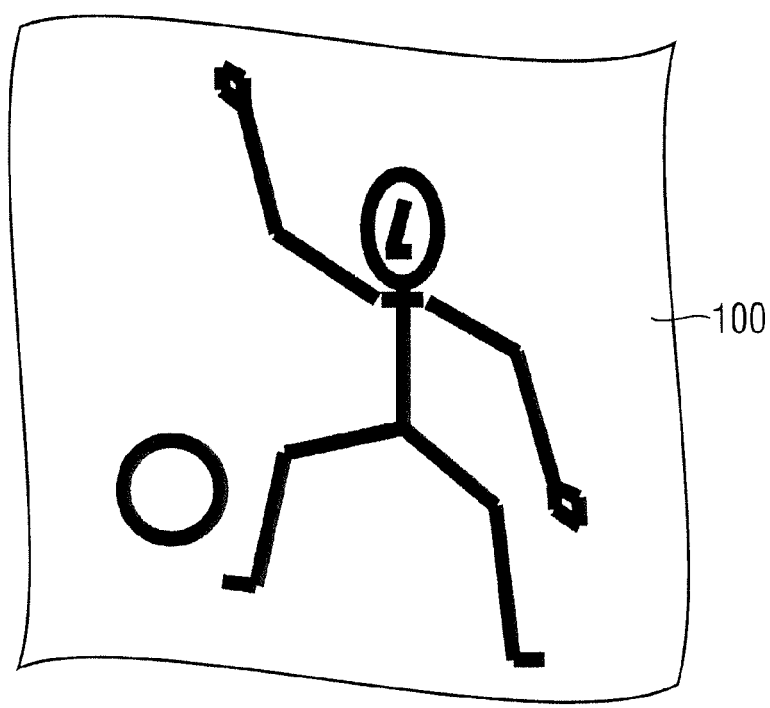

Shown are:

FIG. 1 a schematic diagram of a banknote having an embedded security thread and an affixed transfer element, FIG. 2 schematically, the layer structure of a security element according to the present invention, in cross section, FIG. 3 highly schematically, a modulo magnification arrangement to explain the operating principle of arrangements according to the present invention, FIG. 4 for an exemplary embodiment of the present invention, in (a), a specified target motif in the form of the letter "P", in (b), a section of the lattice pattern of the lens grid provided for viewing, and in (c), the calculated image function of the associated motif image, FIG. 5 for another exemplary embodiment of the present invention, in (a), a specified target motif in the form of the letter "P", and in (b), the calculated image function of the associated motif image, FIG. 6 a diagram as in FIG. 5 for a further exemplary embodiment of the present invention, FIG. 7 an exemplary embodiment having a cell grid that is constant in some regions, FIG. 8 for a tilt image according to an exemplary embodiment of the present invention, in (a) and (b), specified target motifs in the form of the letters "P" and "L", and in (c), the calculated image function of the associated motif image, and FIGS. 9 and 10 in each case, a depiction as in FIG. 5 for further exemplary embodiments of the present invention.

The invention will now be explained using the example of security elements for banknotes. For this, FIG. 1 shows a schematic diagram of a banknote 10 that is provided with two security elements 12 and 16 according to exemplary embodiments of the present invention. The first security element constitutes a security thread 12 that emerges at certain window regions 14 at the surface of the banknote 10, while it is embedded in the interior of the banknote 10 in the regions lying therebetween. The second security element is formed by an affixed transfer element 16 of arbitrary shape. The security element 16 can also be developed in the form of a cover foil that is arranged over a window region or a through opening in the banknote. The security element can be designed for viewing in top view, looking through, or for viewing both in top view and looking through. Also two-sided designs can be used in which lens grids are arranged on both sides of a motif image.

Both the security thread 12 and the transfer element 16 can include a modulo magnification arrangement according to an exemplary embodiment of the present invention. The operating principle and the inventive manufacturing method for such arrangements are described in greater detail in the following based on the transfer element 16.

For this, FIG. 2 shows, schematically, the layer structure of the transfer element 16, in cross section, with only the portions of the layer structure being depicted that are required to explain the functional principle. The transfer element 16 includes a substrate 20 in the form of a transparent plastic foil, in the exemplary embodiment a polyethylene terephthalate (PET) foil about 20 μm thick.

The top of the substrate foil 20 is provided with a grid-shaped arrangement of microlenses 22 that form, on the surface of the substrate foil, a two-dimensional Bravais lattice having a prechosen symmetry. The Bravais lattice can exhibit, for example, a hexagonal lattice symmetry. However, also other, especially lower, symmetries and thus more general shapes are possible, such as the symmetry of a parallelogram lattice.

The spacing of adjacent microlenses 22 is preferably chosen to be as small as possible in order to ensure as high an areal coverage as possible and thus a high-contrast depiction.

The spherically or aspherically designed microlenses 22 preferably exhibit a diameter between 5 μm and 50 μm and especially a diameter between merely 10 μm and 35 μm and are thus not perceptible with the naked eye. It is understood that, in other designs, also larger or smaller dimensions may be used. For example, the microlenses in modulo magnification arrangements can exhibit, for decorative purposes, a diameter between 50 μm and 5 mm, while in modulo magnification arrangements that are to be decodable only with a magnifier or a microscope, also dimensions below 5 μm can be used.

On the bottom of the carrier foil 20 is arranged a motif layer 26 that includes a motif image, subdivided into a plurality of cells 24, having motif image elements 28.

The optical thickness of the substrate foil 20 and the focal length of the microlenses 22 are coordinated with each other such that the motif layer 26 is located approximately the lens focal length away. The substrate foil 20 thus forms an optical spacing layer that ensures a desired, constant separation of the microlenses 22 and the motif layer 26 having the motif image.

To explain the operating principle of the modulo magnification arrangements according to the present invention, FIG. 3 shows, highly schematically, a modulo magnification arrangement 30, which is not depicted to scale, having a motif plane 32 in which the motif image with its motif image elements, arranged in cells, is located, and having a lens plane 34 in which a microlens grid is provided. The modulo magnification arrangement 30 produces an image plane 36 in which the target image perceived by the viewer 38 appears.

Very generally, the target image (object) to be depicted is described by an image function f(x,y,z), wherein the z-axis stands normal to the motif plane 32 spanned by the x- and y-axis, and to the lens plane 34. If e denotes the focal length (in general, the lens data and the refractive index of the medium between the lens grid and the motif grid are taken into account in the effective distance e), then the magnification v or 1/v describes the imaging scale between objects at the depth z and their image in the plane of projection (x, y, e). A positive v is taken if the object is to lie in the depth behind the raster image arrangement when viewed with both eyes, and v is negative if the object is to float in front of the raster image arrangement when viewed with both eyes.

In the present application, only planar target images are considered, in other words target images having an image function f(x, y, z=const) that can be described by a function f(x,y) of only the variables x and y. The use of such planar target images having a constant z-coordinate has the advantage that the perspective image of such target images is not distorted in perspective, but rather is merely shrunk. The depth at which a planar target image appears to lie when viewed is given by the relationship z=v e, in other words, is a function of the magnification and the focal length. Even if the constant coordinate z is not explicitly mentioned any more in the following, it must always be taken into account that, for a given focal length, the apparent depth depends on the magnification of the micromotif elements.

The image function f(x,y) can indicate a brightness distribution of the target image (grayscale image), a color distribution (color image), a binary distribution (line drawing) or also other image properties, such as transparency, reflectivity, density or the like, in other words, in general, can represent not only a scalar, but also a vector-valued function of the spatial coordinates x and y.

The arrangement of the microlenses in the lens plane 34 is described by a two-dimensional Bravais lattice whose unit cell is specified by vectors $w_1$ and $w_2$ (having the components $w_{11}$, $w_{21}$ and $w_{12}$, $w_{22}$). In compact notation, the unit cell can also be specified in matrix form by a lens grid matrix W:

$$W = (w_1, w_2) = \begin{pmatrix} w_{11} & w_{12} \\ w_{21} & w_{22} \end{pmatrix}.$$

In the following, the lens grid matrix W is also often simply called a lens matrix or lens grid. In the lens plane 34, in place of lenses 22, also, for example, circular apertures can be used, according to the principle of the pinhole camera. Also all other types of lenses and imaging systems, such as aspherical lenses, cylindrical lenses, slit apertures, circular or slit apertures provided with reflectors, Fresnel lenses, GRIN lenses (Gradient Refractive Index), zone plates (diffraction lenses), holographic lenses, concave reflectors, Fresnel reflectors, zone reflectors and other elements having a focusing or also a masking effect, can be used as viewing elements in the viewing grid.

In principle, in addition to elements having a focusing effect, also elements having a masking effect (circular or slot apertures, also reflector surfaces behind circular or slot apertures) can be used as viewing elements in the viewing grid.

When a concave reflector array is used, and with other reflecting viewing grids used according to the present invention, the viewer looks through the in this case partially transmissive motif image at the reflector array lying therebehind and sees the individual small reflectors as light or dark points of which the image to be depicted is made up. Here, the motif image is generally so finely patterned that it can be seen only as a fog. The formulas described for the relationships between the image to be depicted and the motif image apply also when this is not specifically mentioned, not only for lens grids, but also for reflector grids. It is understood that, when concave reflectors are used according to the present invention, the reflector focal length takes the place of the lens focal length.

If, in place of a lens array, a reflector array is used according to the present invention, the viewing direction in FIG. 2 is to be thought from below, and in FIG. 3, the planes 32 and 34 in the reflector array arrangement are interchanged. The present invention is described based on lens grids, which stand representatively for all other viewing grids used according to the present invention.

The motif image in the motif plane 32 that produces the desired target image f(x,y) in the image plane 36 when viewed through the lens grid W arranged in the lens plane 34 is described by an image function m(x,y) that, according to the present invention, is given by (E1):

$$m(x, y) = \tag{E2}$$
$$f\left(\binom{x}{y} + (A(x,y) - I) \cdot \left(\left(\left(\binom{x}{y} + w_d(x,y)\right) \bmod W\right) - w_d(x,y) - w_c(x,y)\right)\right) \cdot g(x,y)$$

where $$w_d(x, y) = W \cdot \binom{d_1(x,y)}{d_2(x,y)} \text{ and } w_c(x, y) = W \cdot \binom{c_1(x,y)}{c_2(x,y)}$$

In the formulas (E1) and (E2), the matrix $$A(x, y) = \begin{pmatrix} a_{11}(x,y) & a_{12}(x,y) \\ a_{21}(x,y) & a_{22}(x,y) \end{pmatrix}$$

describes a desired magnification and movement behavior of the depicted target image when the security element is tilted laterally and vertically.

I is the 2×2 identity matrix, the vector $(c_1(x,y), c_2(x,y))$, where $0 \leq c_1(x, y), c_2(x, y) < 1$, indicates the relative position of the center of the lenses 22 within the cells of the motif image, the vector $(d_1(x,y), d_2(x,y))$, where $0 \leq d_1(x, y), d_2(x, y) < 1$, represents a location-dependent displacement of the cell boundaries in the motif image, and g(x,y) is a mask function for adjusting the visibility of the target image.

The more detailed significance and scope of the individual terms of the formulas (E1) and (E2) will be explained in greater detail below using a range of concrete exemplary embodiments of increasing complexity.

First, the modulo operation of the formula (E2), from which the modulo magnification arrangement derives its name, will be addressed briefly. For a vector s and an invertible 2×2 matrix W, the expression s mod W, as a natural expansion of the usual scalar modulo operation, represents a reduction of the vector s to the fundamental mesh of the lattice described by the matrix W (the "phase" of the vector s within the lattice W).

Formally, the expression s mod W can be defined as follows: Let $$q = \binom{q_1}{q_2} = W^{-1}s$$

and $q_i = n_i + p_i$ with integer $n_i \in Z$ and $0 \leq p_i < 1$ (i=1,2), or in other words, let $n_i = \text{floor}(q_i)$ and $p_i = q_i \bmod 1$. Then $s = Wq = (n_1 w_1 + n_2 w_2) + (p_1 w_1 + p_2 w_2)$, wherein $(n_1 w_1 + n_2 w_2)$ is a point on the lattice $WZ^2$ and $$s \bmod W = p_1 w_1 + p_2 w_2$$

lies in the fundamental mesh of the lattice and indicates the phase of s with respect to the lattice W.

While, in the moiré magnifier mentioned in the introduction of this description, the shrunk individual motif that is arranged in the array must fit completely in a cell of the motif image, this is not required for the modulo magnification arrangement according to the present invention. Even if, as is the case in preferred designs, the support of $$f\left((A - I) \cdot \binom{x}{y}\right)$$

does not fit in a cell W, in other words is so large that it is always cut off at the cell boundaries, the target image is nevertheless completely visible.

EXAMPLE 1

The simplest example describes a mere magnification v without particular movement effects when the modulo magnification arrangement is tilted. The magnification and movement matrix A is then given by $$A = \begin{pmatrix} v & 0 \\ 0 & v \end{pmatrix}.$$

Further, let the cell boundaries in the motif image be location independent $((d_1(x,y), d_2(x,y)) \equiv 0)$ and let the mask function g be the identity function ($g \equiv 1$). The formulas (E1) and (E2) specified above then reduce to $$m(x, y) = f\left(\binom{x}{y} + (v-1) \cdot \left(\left(\binom{x}{y}\right) \bmod W\right) - W \cdot \binom{c_1}{c_2}\right) \tag{E3}$$

If the lenses 22 lie in the center of a cell, then, further, $c_1 = c_2 = 0.5$.

For the exemplary embodiment of FIG. 4, let the lens grid W be given by the lattice vectors $w_1 = (2.0 \text{ mm}, 0 \text{ mm})$ and $w_2 = (0.54 \text{ mm}, 2.03 \text{ mm})$. The float depth of the target image is to be z=20e such that the magnification results in v=z/e=20.

For illustration, FIG. 4(a) shows a specified target image 40 in the form of the letter "P", FIG. 4(b) shows a section of the lattice pattern 42 of the lens grid W and FIG. 4(c) shows the image function m(x,y) of the motif image 44, calculated by means of formula (E3), that, upon appropriate scaling, reconstructs precisely the target image in FIG. 4(a) when viewed with the lens grid W.

As can be clearly seen especially from FIG. 4(c), a substantial characteristic of the "modulo mapping" method according to the present invention consists in that the motif image 44 is subdivided into cells that correspond to the cells of the lens grid W. The imaged subregions of the target image 40 are located in these cells. When the motif image 44 is viewed with the aid of a suitable microlens array, such as the lens grid W, the desired target image 40 is reconstructed for the viewer.

If the viewing angle is changed such that the lens foci run beyond the cell boundary, then a motif jump is seen in that instant. By no means must the motif jump be judged negatively: Rather, it is an optically variable effect that constitutes a clear difference, for example to printed images, and thus can contribute to authentication.

The motif image can also be magnified with different intensities in different directions. In the case of different magnifications $v_x$, $v_y$ in the x- and y-direction, the magnification and movement matrix is represented in the form $$A = \begin{pmatrix} v_x & 0 \\ 0 & v_y \end{pmatrix}.$$

If the eyes are adjacent in the x-direction (which can be easily achieved by suitable rotation of the security element or by a corresponding standard orientation of the security element, for example on a banknote), then it often makes sense to magnify only in the x-direction, $v_x=z/e$, and in the y-direction, to work without magnification, in other words with $v_y=1$, since, for three-dimensional vision, only the behavior in the x-direction is decisive. In this case, $$m(x, y) = f\left( \begin{pmatrix} x \\ y \end{pmatrix} + \begin{pmatrix} \frac{z}{e}-1 & 0 \\ 0 & 0 \end{pmatrix} \cdot \left( \left( \begin{pmatrix} x \\ y \end{pmatrix} \bmod W \right) - W \cdot \begin{pmatrix} c_1 \\ c_2 \end{pmatrix} \right) \right) \text{ applies.}$$

If one direction of the lens grating is now laid in the y-direction, then the lattice constant of the lens array in this direction can be chosen arbitrarily. The lens grating can thus be designed arbitrarily in one direction, for example also in the form of cylindrical lenses. Example 7 described below includes a more general exemplary embodiment for viewing the motif image with cylindrical lenses.

EXAMPLE 2

Through a suitable choice of the magnification and movement matrix A, it can be achieved that the target image moves when the viewing direction is changed or when the modulo magnification arrangement is tilted in an arbitrarily specified direction.

For a general linear movement, $$A = \begin{pmatrix} a_{11} & a_{12} \\ a_{21} & a_{22} \end{pmatrix} = \begin{pmatrix} v_1 \cdot \cos\phi_1 & v_2 \cdot \cos\phi_2 \\ v_1 \cdot \sin\phi_1 & v_2 \cdot \sin\phi_2 \end{pmatrix}.$$

For the sake of simplicity, let, as in example 1, D=0 and g=1, then the formulas (E1) and (E2) reduce to $$m(x, y) = f\left( \begin{pmatrix} x \\ y \end{pmatrix} + (A-I) \cdot \left( \left( \begin{pmatrix} x \\ y \end{pmatrix} \bmod W \right) - W \cdot \begin{pmatrix} c_1 \\ c_2 \end{pmatrix} \right) \right). \quad (E4)$$

If the motif image for a specified target image f(x,y) is determined with the relationship (E4), then, when the motif image is viewed through the lens grid W, the target image f(x,y) is reconstructed with the movement behavior described by the matrix A.

If the modulo magnification arrangement is tilted horizontally about a vertical axis, then the target image moves with a speed $v_1$ in the direction of the vector $(a_{11}, a_{21})$, in other words in the direction $\phi_1$. If the arrangement is tilted vertically about a horizontal axis, then the target image moves with the speed $v_2$ in the direction of the vector $(a_{12}, a_{22})$, in other words in the direction $\phi_2$.

Here, designs are particularly preferred in which $\phi_1$ is not equal to zero and is not equal to 180° and/or $\phi_2$ is not equal to 90° and is not equal to −90° and/or $v_1$ is not equal to $v_2$.

An exact orthoparallactic movement results if $\phi_1=90°$, $\phi_2=0°$, if $\phi_1=90°$, $\phi_2=180°$, if $\phi_1=-90°$, $\phi_2=0°$ or if $\phi_1=-90°$, $\phi_2=180°$.

The speed with which static objects or object portions move relative to each other when the viewing direction is changed is a measure of their depth in space, also when viewed with one eye. When viewed with both eyes, the depth in space is given by the movement behavior in the eye separation direction. If the eyes are adjacent in the x-direction, then Depth perception=$e \cdot a_{11} = e \cdot v_1 \cdot \cos \phi_1$.

If the eyes lie at the angle $\psi$ to the x-axis, then

Depth perception=$e \cdot (a_{11} \cdot \cos^2\psi + (a_{12}+a_{21}) \cdot \cos \psi \sin \psi + a_{22} \cdot \sin^2 \psi)$.

The depth impression can turn out differently depending on the eye separation direction or tilt direction. An applied motif image according to relationship (E4) thus produces a depth impression wherein the depicted object can move in an unusual way.

For illustration, the exemplary embodiment of FIG. 5 shows, in (a), as the desired target image 50, the letter "P" that is to float in front of the image plane when viewed through a lens grid W. When tilted in the horizontal direction, the image is to move along a straight line that, with the x-axis, encloses an angle of $\phi_1=32°$. Tilting in the vertical direction, in contrast, is to lead to the image moving with greater speed at an angle of $\phi_2=-43°$ relative to the x-axis.

The lens grid depicted in FIG. 4(*b*) is to be used as the lens grid W. If $z=-19 \cdot \cos(32°) \cdot e = -16.1 \cdot e$ is taken as the float depth, then, with the aid of the formula (E4), the motif image 52 shown in FIG. 5(*b*) results.

EXAMPLE 3

In the further exemplary embodiment in FIG. 6, (a) shows, as the target image 60, a letter P that is to float behind the image plane when viewed through a lens grid W. This exemplary embodiment illustrates a particularly interesting movement behavior in which the target image always moves in the same direction, irrespective of the tilt direction.

In this case, the associated magnification and movement matrix A is not invertible, such that such a behavior cannot be produced with the special case of a moiré magnifier described below, or in moiré mapping.

If the lens grid W in example 1 (FIG. 4(*b*)) is again chosen as the lens grid, $$A = \begin{pmatrix} 20\cos(30°) & 30\cos(30°) \\ 20\sin(30°) & 30\sin(30°) \end{pmatrix}$$

as the magnification and movement matrix, and $z=20 \cos(30°) \cdot e = 17.3 \cdot e$ for the float depth, then, when calculated with the aid of the formula (E4), the motif image 62 depicted in FIG. 6(*b*) results that appears to float at a depth z when viewed through the lens grid W, and that moves along a straight line that encloses an angle of 30° with the x-direction when tilted, irrespective of the tilt direction. Due to the chosen prefactors $v_1=20$ and $v_2=30$, when tilted in the vertical direction about a horizontal tilt axis, the target image moves faster then when tilted in the horizontal direction.

EXAMPLE 4

In example 4, based on the formula (E4) in example 2, when viewed normally, in other words with the eye separation being in the x-direction, the target image f(x,y) is to be visible at a depth $z_1$ ($z_1$ positive), or to appear to float at a height $z_1$ ($z_1$ negative) over the arrangement.

When the arrangement, rotated by 90°, is viewed (eye separation in the y-direction), the target image f(x,y) is to be visible at a depth $z_2$ ($z_2$ positive) or to appear to float at a height $z_2$ ($z_2$ negative) over the arrangement.

If e again denotes the effective distance of the lens grid from the motif image to be created, then $a_{11}=z_1/e$, $a_{21}$ is arbitrary,
$a_{22}=z_2/e$, $a_{12}$ is arbitrary, are chosen to achieve the desired effect.

EXAMPLE 5

In example 4, based on the formula (E4) in example 2, when viewed normally (eye separation in the x-direction), the target image f(x,y) is to be visible at a depth $z_1$ ($z_1$ positive) or to appear to float at a height $z_1$ ($z_1$ negative) over the arrangement, and upon tilting the arrangement horizontally or upon a horizontal change in the viewing direction, the image is to move in the direction $\phi_1$.

When the arrangement, rotated by 90°, is viewed (eye separation in the y-direction), the target image f(x,y) is to be visible at a depth $z_2$ ($z_2$ positive) or to appear to float at a height $z_2$ ($z_2$ negative) over the arrangement, and upon tilting the arrangement vertically or upon a vertical change in the viewing direction, the image is to move in the direction $\phi_2$ with respect to the x-axis.

To achieve this effect, $$A = \begin{pmatrix} \dfrac{z_1}{e} & \dfrac{z_2}{e} \cdot \cot\phi_2 \\ \dfrac{z_1}{e} \cdot \tan\phi_1 & \dfrac{z_2}{e} \end{pmatrix}$$

is chosen, e again denoting the effective distance of the lens grid from the motif image to be created.

EXAMPLE 6

Expanding on example 5, the desired depth of the target image points and/or the movement behavior can also be location dependent, in other words, in the most general case, given by location-dependent variables $z_1(x, y)$, $z_2(x, y)$, $\phi_1(x, y)$, and $\phi_2(x, y)$.

Also this case is described by the formula (E4), albeit having a location-dependent magnification and movement matrix A:

$$A = \begin{pmatrix} a_{11}(x, y) & a_{12}(x, y) \\ a_{21}(x, y) & a_{22}(x, y) \end{pmatrix} = \begin{pmatrix} \dfrac{z_1(x, y)}{e} & \dfrac{z_2(x, y)}{e} \cdot \cot\phi_2(x, y) \\ \dfrac{z_1(x, y)}{e} \cdot \tan\phi_1(x, y) & \dfrac{z_2(x, y)}{e} \end{pmatrix}.$$

EXAMPLE 7

In a further exemplary embodiment, the target image f(x,y) is to be visible not only when viewed through a normal circular/lens grid, but also when viewed through a slot grid or cylindrical lens grid, with especially a non-periodically-repeating individual image being able to be specified as the target image.

This case, too, can be described by the formula (E4), wherein, if the motif image to be created is not transformed in the slot/cylinder direction with respect to the target image, a special matrix A is required that can be identified as follows:

If the cylinder axis direction lies in the y-direction and if the cylinder axis distance is d, then the slot or cylindrical lens grid is described by:

$$W = \begin{pmatrix} d & 0 \\ 0 & \infty \end{pmatrix}.$$

The suitable matrix A, in which no magnification or distortion is present in the y-direction, is then:

$$A = \begin{pmatrix} a_{11} & 0 \\ a_{21} & 1 \end{pmatrix} = \begin{pmatrix} v_1 \cdot \cos\phi_1 & 0 \\ v_1 \cdot \sin\phi_1 & 1 \end{pmatrix} = \begin{pmatrix} \dfrac{z_1}{e} & 0 \\ \dfrac{z_1}{e} \cdot \tan\phi_1 & 1 \end{pmatrix}.$$

Here, in the relationship (A-I)W, the matrix (A-I) operates only on the first row of W such that W can represent an infinitely long cylinder.

The motif image to be created, having the cylinder axis in the y-direction, then results in:

$$f\left(\begin{pmatrix} x \\ y \end{pmatrix} + \begin{pmatrix} a_{11}-1 & 0 \\ a_{21} & 0 \end{pmatrix} \cdot \left(\left(\begin{pmatrix} x \\ y \end{pmatrix} \bmod W\right) - W \cdot \begin{pmatrix} c_1 \\ c_2 \end{pmatrix}\right)\right) =$$
$$f\left(\begin{pmatrix} x + (a_{11}-1) \cdot ((x \bmod d) - d \cdot c_1) \\ y + a_{21} \cdot ((x \bmod d) - d \cdot c_1) \end{pmatrix}\right)$$

wherein it is also possible that the support of $$f\left(\begin{pmatrix} a_{11}-1 & 0 \\ a_{21} & 0 \end{pmatrix} \cdot \begin{pmatrix} x \\ y \end{pmatrix}\right)$$

does not fit in a cell W, and is so large that the pattern to be created displays no complete continuous images in the cells. The pattern produced in this way permits viewing not only with the slot aperture array or cylindrical lens array $$W = \begin{pmatrix} d & 0 \\ 0 & \infty \end{pmatrix},$$

but also with a circular aperture array or lens array, where $$W = \begin{pmatrix} d & 0 \\ d \cdot \tan\beta & d_2 \end{pmatrix},$$

$d_2$ and $\beta$ being arbitrary.

EXAMPLE 8

Example 8 serves to illustrate the special case that the motif image elements in the cells of the motif image differ only by a displacement. In this case, the modulo magnification arrangement can also be described as a moiré magnification arrangement:

Under the cited conditions, a motif image array can be constructed with an assortment of uniform motif image elements, these image elements being arranged in a lattice array having the unit cell $$U = \begin{pmatrix} u_{11} & u_{12} \\ u_{21} & u_{22} \end{pmatrix}.$$

In the case of rear projection and when viewed, then not just a single object is seen, but an object array having a unit cell number $$T = \begin{pmatrix} t_{11} & t_{12} \\ t_{21} & t_{22} \end{pmatrix}.$$

The viewing is to occur with a lens array having the unit $$W = \begin{pmatrix} w_{11} & w_{12} \\ w_{21} & w_{22} \end{pmatrix},$$

the magnification factor to be $v=z/e$.

The target image is formed by an object $f(x,y)$ that, in the special case under consideration, must be chosen such that it fits in the cell $T=(v-1)\cdot W$. Then, for the motif image to be created periodically $$f\left(v \cdot \left(\begin{pmatrix} x \\ y \end{pmatrix} \bmod U\right)\right), \quad U = (1 - 1/v) \cdot W \tag{E5}$$

applies, and for the periodically appearing target image floating at the height z $$f\left(\begin{pmatrix} x \\ y \end{pmatrix} \bmod T\right), \quad T = (v-1) \cdot W.$$

If one wants to depict not just objects in space, in other words, the objects are to move arbitrarily when the viewing direction is changed, then instead of the magnification v, an arbitrary imaging A is applied that comprises, in addition to the magnification, also rotations and shear mappings. Then, as described in greater detail in the publication WO 2007/076952 A2, the disclosure of which is incorporated herein by reference, the following applies:

A lens array having the unit cell number $$W = \begin{pmatrix} w_{11} & w_{12} \\ w_{21} & w_{22} \end{pmatrix}$$

is present, as well as a magnification and movement matrix $$A = \begin{pmatrix} a_{11} & a_{12} \\ a_{21} & a_{22} \end{pmatrix}.$$

A target image is given by an object $f(x,y)$ that is chosen such that it fits in the cell $T=(A-I)\cdot W$. Then, for the motif image to be created periodically, $$f\left(A \cdot \left(\begin{pmatrix} x \\ y \end{pmatrix} \bmod U\right)\right), \quad U = (I - A^{-1}) \cdot W \tag{E6}$$

applies, and for the periodically appearing target image, $$f\left(\begin{pmatrix} x \\ y \end{pmatrix} \bmod T\right), \quad T = (A - I) \cdot W = A \cdot U.$$

Since the formula (E5) works only with magnification, it is allocated to the moiré magnifier. In formula (E6), the general mapping A replaces the magnification, such that the principle introduced by this is referred to in the context of this description as "moiré mapping".

EXAMPLE 9

In the examples 1 to 8, the vector $(d_1(x,y), d_2(x,y))$ was identical to zero and the cell boundaries were distributed uniformly across the entire area. In some embodiments, however, it can also be advantageous to displace the grid of the cells in the motif plane location dependently $((d_1(x,y), d_2(x,y))\neq 0)$ because, in this way, it is possible to achieve special optical effects upon changing the viewing direction. With $g=1$, the formulas (E1) and (E2) are then represented in the form $$m(x,y) = f\left(\begin{pmatrix} x \\ y \end{pmatrix} + (A-I) \cdot \left(\left(\begin{pmatrix} x \\ y \end{pmatrix} + W \cdot \begin{pmatrix} d_1(x,y) \\ d_2(x,y) \end{pmatrix}\right) \bmod W\right) - W \cdot \begin{pmatrix} d_1(x,y) \\ d_2(x,y) \end{pmatrix} - W \cdot \begin{pmatrix} c_1 \\ c_2 \end{pmatrix}\right) \tag{E7}$$

where $0 \leq d_1(x,y), d_2(x,y) < 1$. As evident from the formula (E7), only the cell boundaries are displaced by values $d_1$ and/or $d_2$ not equal to zero, the grid and the phase of the motif elements do not change.

For illustration, FIG. 7 shows an exemplary embodiment having a cell grid that is constant in some regions. Here, as the target image 70, the lettering "LOUIS" depicted in FIG. 7(a) is specified that is broken down into target image regions

71-A, 72-A, 73-A, 74-A and 75-A in which the cell grid is constant in each case. At the region boundaries, phase jumps occur between the cell grids of the adjoining regions.

FIG. 7(*b*) shows schematically how the cell grids of the five subregions 71-B, 72-B, 73-B, 74-B and 75-B in the motif image are displaced against each other. Simplified, each grid is represented here by the contour of a single cell.

If the lens grid is now arranged such that the center points of the lenses lie exactly in the center of the cells 73-B, then, when viewed vertically, the foci target the central region 76 of all subregions 71-B to 75-B, the viewer thus perceives the whole word "LOUIS". If the security element is tilted to the right, then the foci of the lenses cross the cell boundaries in the region 71-B of the motif image and lead to a motif jump there. Due to this, in the depicted target image, the letter "L" in the region 71-A leaves its place in the word "LOUIS" and jumps, depending on the type of mapping, to another location.

If the security element is tilted to the left, then the foci of the lenses cross the cell boundaries in the region 74-B of the motif image accordingly, and lead to a motif jump in the target image, in which the letter "I" in the region 74-A leaves its place in the word "LOUIS". The letters "O" and "S" in the regions 72-B and 75-B display analogous behavior when the security element is tilted in the vertical direction.

A further possibility to use location-dependent cell boundaries consists in a random displacement of all lens cells outside of a shared region. As long as the security element is viewed from a solid angle range from which the region that is common to the cells is probed, the corresponding target image is visible. If this region is left by tilting the element in an arbitrary direction, then the image points produced by the individual cells overlap in a random manner such that the depicted target image disappears and is replaced by a mixed color.

EXAMPLE 10

For some applications, an angle limit when viewing the motif images can be desired, i.e. the depicted target image should not be visible from all directions, or even should be perceptible only in a small image angle range.

Such an angle limit can be advantageous especially in combination with the alternating images described below, since the switch from one motif to the other is generally not perceived by both eyes simultaneously. This may lead to a situation in which, during the switch, an undesired double image can be seen as a superposition of adjacent image motifs. However, if the individual images are bordered by an edge of suitable width, such a visually undesired superimposition can be suppressed.

Further, it has become evident that the imaging quality can possibly deteriorate considerably when the lens array is viewed obliquely from above: While a sharp image is perceptible when the arrangement is viewed vertically, in this case, the image becomes less sharp with increasing tilt angle and appears blurry. For this reason, an angle limit can also be advantageous for the depiction of individual target images if it masks out especially the areal regions between the lenses that are probed by the lenses only at relatively high tilt angles. In this way, the target image disappears for the viewer upon tilting before it can be perceived blurrily.

Such an angle limit can be achieved by a mask function $g \neq 1$ in formula (E1). A simple example of such a mask function is $$g\begin{pmatrix} x \\ y \end{pmatrix} = \begin{bmatrix} 1 & \text{for } (x, y) \bmod W = t_1(w_{11}, w_{21}) + t_2(w_{12}, w_{22}) \\ & \text{where } k_{11} \leq k_{12} \text{ and } k_{21} \leq t_2 \leq k_{22} \\ 0 & \text{otherwise} \end{bmatrix}$$

where $0 \leq k_{ij} < 1$. In this way, only a section of the lattice cell $(w_{11}, w_{21})$, $(w_{12}, w_{22})$ is used, namely the region $k_{11} \cdot (w_{11}, w_{21})$ to $k_{12} \cdot (w_{11}, w_{21})$ in the direction of the first lattice vector and the region $k_{21} \cdot (w_{12}, w_{22})$ to $k_{22} \cdot (w_{12}, w_{22})$ in the direction of the second lattice vector. As the sum of the two edge regions, the width of the masked-out strips is $(k_{11}+(1-k_{12})) \cdot (w_{11}, w_{21})$ or $(k_{21}+(1-k_{22})) \cdot (w_{12}, w_{22})$.

It is understood that the function $g(x,y)$ can, in general, specify the distribution of covered and uncovered areas within a cell arbitrarily. In addition to the angle limit, mask functions can also contribute to limiting the image field, i.e. the target image is covered in some regions. In this case, the mask function is given by $$g\begin{pmatrix} x \\ y \end{pmatrix} = \begin{bmatrix} 1 & \text{in regions in which the target image is to be visible} \\ 0 & \text{in regions in which the target image is not to be visible} \end{bmatrix}$$

When a mask function $g \neq 1$ is used, in the case of location-independent cell boundaries in the motif image, one obtains from the formulas (E1) and (E2) for the image function $m(x, y)$:

$$m(x, y) = f\left(\begin{pmatrix} x \\ y \end{pmatrix} + (A - I) \cdot \left(\begin{pmatrix} x \\ y \end{pmatrix} \bmod W\right) - W \cdot \begin{pmatrix} c_1 \\ c_2 \end{pmatrix}\right) \cdot g(x, y).$$

EXAMPLE 11

While, as explained in detail in example 8, in designs that use the moiré effect, the object to be depicted necessarily occurs repeatedly in the form of a periodic array arrangement, in the case of the modulo magnifier according to the present invention and the more general modulo mapping, the object to be depicted appears as an individual image. In preferred embodiments of the present invention, the target image is not periodic.

If however, a repeating of the object is desired, then the periodic arrangement of an object in the target image to be depicted can be accommodated, on the one hand, in that the target image is specified having a plurality of periodically arranged objects. Alternatively, the object and its periodicity can be specified just once, and the periodicity taken into account in the formulas for calculating the motif image.

In the latter approach, the object $f(x,y)$ is specified having a unit cell, described by a 2×2 matrix P, that describes the desired periodicity. To account for the periodic arrangement, it is sufficient to replace $$\begin{pmatrix} x \\ y \end{pmatrix} \text{ with } \begin{pmatrix} x \\ y \end{pmatrix} \bmod P$$

in the appropriate formulas. For example, the formula (E4) is then represented in the following form:

$$m(x, y) = f\left(\binom{x}{y} \bmod P + (A - I) \cdot \left(\left(\binom{x}{y} \bmod P\right) \bmod W - W \cdot \binom{c_1}{c_2}\right)\right)$$

where $$A = \begin{pmatrix} a_{11} & a_{12} \\ a_{21} & a_{22} \end{pmatrix}, W = \begin{pmatrix} w_{11} & w_{12} \\ w_{21} & w_{22} \end{pmatrix}, P = \begin{pmatrix} p_{11} & p_{12} \\ p_{21} & p_{22} \end{pmatrix}.$$

In the case of a periodic design, the periodicity P is preferably chosen such that the unit cell is $P \neq (A-I)W$.

End of Example 11

In the previous explanations, the modulo magnification arrangement usually depicts an individual target image when viewed. However, the present invention also comprises designs in which the modulo magnification arrangement depicts multiple target images simultaneously or in alternation. In the case of simultaneous depiction, the target images can especially appear at different apparent floating heights or depths. For target images depicted in alternation, the target images can especially transition into one another upon tilting the arrangement. The different target images can be independent of one another or related to one another as regards content, and depict, for example, a motion sequence.

In the following, first the general formulaic description of the motif images of such modulo magnification arrangements for depicting multiple target images is given and then, for illustration, some concrete exemplary embodiments are described in greater detail.

In the general case, the modulo magnification arrangement serves to depict n target images ($n \geq 1$) that are each given by an image function $f_i(x,y)$ ($i=1, 2, \ldots n$). For each target image, an own magnification and movement matrix $A_i$ and an own mask function $g_i$ can be specified such that, for each target image, a describing function $h_i(x,y)$ can be given that, analogously to the individual image formulas (E1) and (E2), is given by (M1):

$$h_i(x, y) = \quad (M2)$$
$$f_i\left(\binom{x}{y} + (A_i(x, y) - I) \cdot \left(\left(\binom{x}{y} + w_{di}(x, y)\right) \bmod W\right) - w_{di}(x, y) - w_{ci}(x, y)\right) \cdot g_i(x, y)$$

$$w_{di}(x, y) = W \cdot \binom{d_{i1}(x, y)}{d_{i2}(x, y)} \text{ and}$$

$$w_{ci}(x, y) = W \cdot \binom{c_{i1}(x, y)}{c_{i2}(x, y)}.$$

The operation on the n describing functions $h_i$ for calculating the image function of the motif image is described by a master function F:

$$m(x,y) = F(h_1, h_2, \ldots h_n). \quad (M3)$$

The master function F can especially constitute the sum function such that $$m(x, y) = F(h_1, h_2, \ldots h_n) = \sum_{i=1}^{n} (h_i(x, y)) \quad (M4)$$

holds. Further examples of possible master functions F are given below, especially in example 14.

EXAMPLE 12

A simple tilt image in which two target images $f_1(x,y)$ and $f_2(x,y)$ alternate as soon as the security element in is tilted appropriately serves as the first example of designs having multiple target images. At which viewing angles the alternation between the two target images takes place is defined by the mask functions $g_1$ and $g_2$. To prevent both images from being visible simultaneously—even when viewed with only one eye—the supports of the functions $g_1$ and $g_2$ are chosen to be disjoint.

The sum function is chosen as the master function F. In this way, as the formula (M5) for the image function of the motif image, $$m(x, y) = \left(f_1\left(\binom{x}{y} + (A_1 - I) \cdot \left(\left(\binom{x}{y} \bmod W\right) - W \cdot \binom{c_{11}}{c_{12}}\right)\right)\right) \cdot g_1\binom{x}{y} +$$
$$\left(f_2\left(\binom{x}{y} + (A_2 - I) \cdot \left(\left(\binom{x}{y} \bmod W\right) - W \cdot \binom{c_{21}}{c_{22}}\right)\right)\right) \cdot g_2\binom{x}{y}$$

results. For a checkerboard-like alternation of the visibility of the two target images, the functions $g_1$ and $g_2$ can be defined according to, for example, the following formulas. In this example, the boundaries between the image regions in the motif image were chosen at 0.5 such that the areal sections belonging to the two images $f_1$ and $f_2$ are of equal size. Of course the boundaries can, in the general case, be chosen arbitrarily. The position of the boundaries determines the solid angle ranges from which the two target images are visible.

$$g_1\binom{x}{y} = \begin{cases} 1 & \text{for } (x, y) \bmod W = t_1(w_{11}, w_{21}) + t_2(w_{12}, w_{22}) \\ & \text{where } 0 \leq t_1, t_2 < 0.5 \text{ or } 0.5 \leq t_1, t_2 < 1 \\ 0 & \text{otherwise} \end{cases}$$

$$g_2\binom{x}{y} = \begin{cases} 0 & \text{for } (x, y) \bmod W = t_1(w_{11}, w_{21}) + t_2(w_{12}, w_{22}) \\ & \text{where } 0 \leq t_1, t_2 < 0.5 \text{ or } 0.5 \leq t_1, t_2 < 1 \\ 1 & \text{otherwise} \end{cases}$$

Instead of checkerboard-like, the target images can also alternate stripwise, for example through the use of the following mask functions as formula (M6):

$$g_1\binom{x}{y} = \begin{cases} 1 & \text{for } (x, y) \bmod W = t_1(w_{11}, w_{21}) + t_2(w_{12}, w_{22}) \\ & \text{where } 0 \leq t_1 < 0.5 \text{ and } t_2 \text{ is arbitrary} \\ 0 & \text{otherwise} \end{cases}$$

$$g_2\binom{x}{y} = \begin{cases} 0 & \text{for } (x, y) \bmod W = t_1(w_{11}, w_{21}) + t_2(w_{12}, w_{22}) \\ & \text{where } 0 \leq t_1 < 0.5 \text{ and } t_2 \text{ is arbitrary} \\ 1 & \text{otherwise} \end{cases}$$

In this case, an alternation of the image information occurs if the security element is tilted along the direction indicated by the vector ($w_{11}$, $w_{21}$), while tilting along the second vector ($w_{12}$, $w_{22}$), in contrast, leads to no image alternation. Here, too, the boundary was chosen at 0.5, i.e. the area of the motif image was subdivided into strips of the same width that alternatingly include the pieces of information of the two target images.

If the strip boundaries lie exactly under the lens center points or the lens boundaries, then the solid angle ranges at which the two images are visible are distributed equally: beginning with the vertical top view, viewed from the right half of the hemisphere, first one of the two target images is seen, and from the left half of the hemisphere, first the other target image. In general, the boundary between the strips can, of course, be laid arbitrarily.

For illustration, FIG. 8 shows an example of a tilt image that, as the first target image 80, depicts the letter "P" (FIG. 8(a)), and as the second target image 82, the letter "L" (FIG. 8(b)). Here, from first viewing directions, only the letter "P" is to be visible, while from second viewing directions, only the letter "L" is to be visible. The image alternation is to occur upon tilting the element about a vertical axis. To achieve this, the image function of the motif image is calculated with the aid of the formulas (M5) and (M6). The resulting motif image 84 is depicted in FIG. 8(c).

It is understood that the described cases for checkerboard-like and stripwise alternation of the image information are merely examples. In general, the area located under a lens can be arbitrarily partitioned into subregions and continued periodically such that an arbitrary parqueting is created. Here, it is not required that the whole area of the motif image be filled with image elements: uncovered areas result in no image being visible from the associated solid angle ranges, which can avoid undesired double images, as already explained above in connection with example 10.

In general, alternating images are characterized in that the image information that is visible for the viewer depends on the viewing angle: From a defined first solid angle range, the viewer sees a first target image, while from a second solid angle range, he can perceive another, second target image.

In principle, the number of depicted target images is not limited, even if manufacturing-related tolerances absolutely can lead to a practical limitation of the number of images. Important influencing variables are the resolution capability of the equipment with which the images are produced and the quality of the lens with whose aid the image information is read out. In the ideal case, the lens scans the entire areal region of the motif plane lying under it with as small a focus as possible. In practice, this is often very difficult to achieve, since the focal length of the lenses is, in general, not completely direction independent. The finite size of the focus leads to blurring as soon as it sweeps over the borderline between two image regions on the motif plane.

A further limitation can result from the fact that the two eyes of the viewer see the security element at slightly different angles such that a double image can be perceived during the switch from one image to the other, as already described above for example 10. Nevertheless, tilt images or alternating images of the kind described have proven to be very visually attractive. In addition to the image information, also depth and movement effects can be chosen to be completely independent of one another from image to image. For example, an image can lie apparently below the paper plane while another lies clearly above it.

EXAMPLE 13

In example 12, alternating images were described in which different images are visible depending on the viewing angle. The individual motifs in such an alternating image are completely independent of one another, and their apparent position and movement in space as well. In contrast to this, in the modulo morphing or modulo cinema described now, the different images are directly associated in meaning.

In the case of modulo morphing, a start image $f_1$ morphs over a defined number of intermediate stages $f_i$ into another image, an end image $f_n$. For example, the morphing of a sphere (start image) into a cube (end image) or of a human face (start image) into an animal face (end image) could be depicted. In modulo cinema, on the other hand, simple motion sequences are preferably shown, for example a figure waving its hand. An initial position corresponds to a start image $f_1$ and, over a defined number of intermediate images $f_i$, changes into an end position that is captured in the end image $f_n$.

For example, the target images $$f_1\binom{x}{y}, f_2\binom{x}{y} \ldots f_n\binom{x}{y}$$

appear in succession when tilted along the direction specified by the vector $(w_{11}, w_{21})$. To achieve this, a subdivision into strips of equal width is carried out with the aid of the mask functions $g_i$. Here, too, $w_{di}=0$ applies for $i=1 \ldots n$, and the sum function is chosen as the master function $f$. In this way, for the image function of the motif image, $$m(x,y) = \sum_{i=1}^{n}\left(\left(f_i\left(\binom{x}{y}\right) + (A_i - I)\cdot\left(\binom{x}{y}\text{mod}W - W\cdot\binom{c_1}{c_2}\right)\right)\right)\cdot g_i\binom{x}{y}\right)$$

$$g_i\binom{x}{y} = \begin{bmatrix} 1 & \text{for } (x,y)\text{mod}W = t_1(w_{11}, w_{21}) + t_2(w_{12}, w_{22}) \\ & \text{where } \frac{i-1}{n} \leq t_1 < \frac{i}{n} \text{ and } t_2 \text{ is arbitrary} \\ 0 & \text{otherwise} \end{bmatrix}$$

results. Generalized, here, too, instead of the regular subdivision expressed in the formula, the strip width can be chosen to be irregular. It is indeed expedient to call up the image sequence by tilting along one direction (linear tilt movement), but this is not absolutely mandatory. Instead, the morph or movement effects can, for example, also be played back through meander-shaped or spiral-shaped tilt movements.

EXAMPLE 14

In examples 12 and 13, the image information was accommodated in the motif image in each case such that different target images, which are independent of one another or also connected to each other in terms of the motif, are visible from different viewing angles. Here, it the goal is principally to always be able to perceive, from a certain viewing direction, only a single target image, but not two or more simultaneously.

However, within the scope of the present invention, the simultaneous visibility of multiple target images is likewise possible and can lead to attractive optical effects. For example, it has proven to be the case that the perception of objects at apparently different depths is facilitated when these objects are visible simultaneously.

Here, the different target images $f_i(x,y)$ can be treated completely independently from one another. This applies to both the image contents in each case and to the apparent position of the depicted objects and their movement in space. While the image contents can be rendered with the aid of drawings, position and movement of the depicted objects are described in the dimensions of the space with the aid of the movement matrices $A_i$. Also the relative phase of the individual target images can be adjusted individually, as expressed by the coefficients $c_{ij}$ in the formula (M1). The relative phase controls at which viewing directions the motifs are perceptible.

If, for the sake of simplicity, the unit function is chosen in each case for the mask functions $g_i$, if the cell boundaries in the motif image are not displaced location dependently, and if the sum function is chosen as the master function F, then, for a series of stacked target images $f_i$:

$$m(x, y) = \sum_i \left( f_i\left( \binom{x}{y} + (A_i - I) \cdot \left( \left( \binom{x}{y} \right) \bmod W \right) - W \cdot \binom{c_{i1}}{c_{i2}} \right) \right)$$

results.

In the superimposition of multiple images, the use of the sum function as the master function corresponds, depending on the character of the image function f, to an addition of the gray, color, transparency or density values, the resulting image values typically being set to the maximum value when the maximum value range is exceeded. However, it can also be more favorable to choose other functions than the sum function for the master function F.

If, for example, the target images are binary encoded, in other words if the image information is present in the form of black-white drawings, then, as the master function, the OR function can be chosen, in which an image point (x,y) is set if at least of one of the corresponding image points (x,y) is set in one of the describing functions $h_i$.

In the case of two binary target images each, also an exclusive or (XOR) function can be performed in which an image point of the motif image is set precisely when the corresponding image points of the describing functions $h_i$ are not identical.

In the case of grayscale exposures in which the image information is stored in the form of grayscales, it can be advantageous if the information of the image that appears to be closest to the viewer dominates over the other images. Upon evaluation, also the movement matrices $A_i$ can be analyzed.

Other function rules can be based on the intensity of the image signals to be depicted: for example, the signal having the highest function value can be chosen to be dominant, in other words, the maximum function chosen as the master function F:

$$m(x, y) = \max_i \left( f_i\left( \binom{x}{y} + (A_i - I) \cdot \left( \left( \binom{x}{y} \right) \bmod W \right) - W \cdot \binom{c_{i1}}{c_{i2}} \right) \right).$$

Further possibilities consist in choosing the signal having the lowest function value, or as above, forming the sum of all function values that meet at a certain point. If there is a maximum upper limit, for example the maximum exposure intensity of a laser exposure device, then the sum can be cut off at this maximum value.

EXAMPLE 15

In designs having stacked images, preferably multiple objects (target images) are arranged such that, when viewed normally, in other words with the eye separation direction in the x-direction, they lie in a certain arrangement behind each other, partially cover each other and, if appropriate, when the viewing direction is changed, move behind each other.

Let n target objects $f_j(x,y)$ $j=1, \ldots n$ be specified that are each to lie at a depth $z_j$, where $z_j > z_{j-1}$. The $A_j$-matrix must then be chosen such that the upper left coefficient is equal to $z_j/e$. For the motif image, $$h_j(x, y) = f_j\left( \binom{x}{y} + (A_j - I) \cdot \left( \left( \binom{x}{y} \right) \bmod W \right) - W \cdot \binom{c_{j1}}{c_{j2}} \right)$$

or generally $$h_j(x, y) = f_j\left( \binom{x}{y} + (A_j - I) \cdot \left( \left( \binom{x}{y} \right) \bmod W \right) - W \cdot \binom{c_{j1}}{c_{j2}} \right) \cdot g_j(x, y)$$

results.

A modified minimum function is chosen as the master function $f$: If, at the position (x,y), $h_j$ is not equal to zero for multiple j, then the smallest j is to be chosen.

As important special cases there can be cited:

a) $A_j = \begin{pmatrix} \frac{z_j}{e} & 0 \\ 0 & \frac{z_j}{e} \end{pmatrix} = \frac{z_j}{e} \cdot I$ The apparent floating depths $z_j$ remain unchanged for all viewing directions and all eye separation directions, and upon rotating the arrangement.

b) $A_j = \begin{pmatrix} \frac{z_j}{e} & 0 \\ 0 & k \cdot \frac{z_j}{e} \end{pmatrix}$ In this special case, the apparent depth changes by the factor k upon rotating the arrangement, in other words, changing the eye separation direction.

c) $A_j = \begin{pmatrix} \frac{z_j}{e} & \frac{z_j}{e} \cdot \cot\phi_2 \\ \frac{z_j}{e} \cdot \tan\phi_1 & \frac{z_j}{e} \end{pmatrix}$ Upon normal viewing (eye separation direction in the x-direction) and tilting the arrangement in the x-direction, the objects move in the direction $\phi_1$ to the x-axis, and upon viewing at a 90° rotation (eye separation direction in the y-direction) and tilting the arrangement in the y-direction, the objects move in the direction $\phi_2$ to the x-axis.

d) $A_j = \begin{pmatrix} \frac{z_j}{e} & 0 \\ 0 & 1 \end{pmatrix}$, or $A_j = \begin{pmatrix} \frac{z_j}{e} & 0 \\ \frac{z_j}{e} \cdot \tan\phi_1 & 1 \end{pmatrix}$ Upon normal viewing (eye separation direction=x-direction) and tilting the arrangement in the x-direction, the objects move in the direction $\phi_1$ to the x-axis. Viewing with a suitable cylindrical lens grid is also possible.

EXAMPLE 16

All embodiments discussed in the context of this description can also be arranged adjacent to one another or nested within one another, for example as alternating images, as in example 12, or as stacked images, as in examples 14 and 15. Here, the boundaries between the image portions need not run in a straight line, but rather can be designed arbitrarily. In particular, the boundaries can be chosen such that they depict the contour lines of symbols or lettering, patterns, shapes of any kind, plants, animals or people.

In preferred embodiments, the image portions that are arranged adjacent to or nested within one another are viewed with a uniform lens array. In addition, also the magnification and movement matrix A of the different image portions can differ in order to facilitate, for example, special movement effects of the individual magnified motifs. It can be advantageous to control the phase relationship between the image portions so that the magnified motifs appear in a defined separation to one another.

An example of image portions that are arranged adjacent to one another and that are imaged with the aid of a homogeneous lens grid is depicted in FIG. 9. The target image 90 consists of words BANK NOTE BANK, the word NOTE floating over the lens plane when the motif image 92 is viewed with a suitable homogeneous lens array, and the two words BANK appearing to lie below the lens plane.

EXAMPLE 17

The magnification and movement matrix A is of prominent importance for the design of a modulo magnification arrangement since it permits, upon specification of a lens grid (defined by the matrix W), the calculation of the motif image plane with the size and arrangement of the image elements. The first column of the A-matrix (column vector) indicates in which direction the magnified image moves when the security feature is tilted about a vertical axis. Accordingly, the second column describes the behavior upon tilting about a horizontal axis.

In the variants described thus far, the A-matrix was usually location independent, i.e. especially its four coefficients were location independent. Consequently, all regions that were calculated with a certain A-matrix appear to be inherently homogeneous as regards, for example, depth and movement effects.

In the general case, however, the magnification and movement matrix A can also be location dependent, in particular, the four coefficients of the A-matrix can be taken as independent functions of the location. If the image of the column vectors as direction vectors is retained, then, based on formula (E4), for an individual target image, the relationship $$m(x, y) = f\left(\begin{pmatrix} x \\ y \end{pmatrix} + (A(x, y) - I) \cdot \left(\begin{pmatrix} x \\ y \end{pmatrix} \bmod W - W \cdot \begin{pmatrix} c_1 \\ c_2 \end{pmatrix}\right)\right)$$

results.

A motif image calculated in this way produces, when viewed, a target image that, when tilted laterally, moves as specified by the vector field $$\begin{pmatrix} a_{11}(x, y) \\ a_{21}(x, y) \end{pmatrix},$$

and when tilted vertically, moves as specified by the vector field $$\begin{pmatrix} a_{12}(x, y) \\ a_{22}(x, y) \end{pmatrix}.$$

With the aid of such a location-dependent magnification and movement matrix A, it is possible, for example, to construct a modulo magnification arrangement that when tilted about a horizontal axis, displays a rotation or a non-linear movement of the magnified image. The tilting behavior about a vertical axis is independent of that and can be used for another, arbitrary effect.

With a location-dependent magnification and movement matrix, also the magnification can be designed to be location dependent.

Now, reference will be made to a further interesting aspect of the designs according to the present invention. Although the two column vectors of the magnification and movement matrix determine the tilting behavior in the horizontal and the vertical direction principally independently of one another, they are nevertheless not visually equivalent. The reason for this lies in the human physiognomy: Since the eyes are arranged adjacently in the x-direction and not stacked, the spatial information included in the first column of the magnification and movement matrix can be perceived immediately, while the spatial information hidden in the second column develops only from the movement behavior upon tilting about a horizontal axis.

Figure 10B:
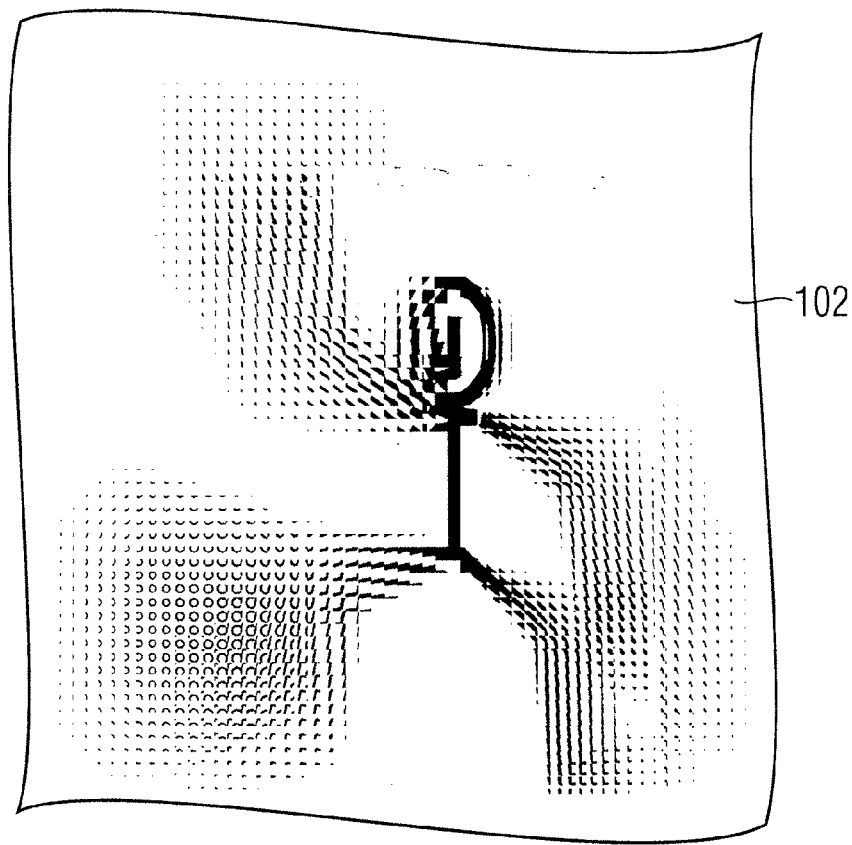

To illustrate the effect of a location-dependent magnification and movement matrix, FIG. 10 shows, in (a), a soccer-playing figure as the target image 100. While it kicks off the ball, it fidgets with its hands and feet. The movements of the ball follow the movements of the tip of the foot. The calculated motif image 102 is depicted in FIG. 10(b).

In the case of a lens grid W that is given by $$W = \begin{pmatrix} 2.0 \text{ mm} & 0 \text{ mm} \\ 0 \text{ mm} & 2.0 \text{ mm} \end{pmatrix},$$

the desired motion sequence is realized with the following magnification and movement matrix:

$$A(x, y) = \frac{1}{3} \begin{pmatrix} x/\text{mm} - 45 & 0 \\ 0 & x/\text{mm} - 45 \end{pmatrix}.$$

It is understood that the effects of a location-dependent magnification and movement matrix can also be used for designs having multiple target images. For example, when tilted laterally, a modulo magnification arrangement can alternate between multiple target images (see example 12) that, upon vertical tilting, each display a movement effect of the kind described.

EXAMPLE 18

Not only the magnification and movement matrix A can be location dependent, also the vector $(c_1(x,y), c_2(x,y))$ can be a function of the location:

Here, in contrast to example 14, the vector ($c_1(x,y)$, $c_2(x,y)$) varies not only from target image to target image, but also within one target image as a function of the location. As explained above, the vector ($c_1(x,y)$, $c_2(x,y)$) describes the position of the cells in the motif image plane relative to the lens array W, the grid of the lens centers being able to be viewed as the reference point set. If the vector ($c_1(x,y)$, $c_2(x,y)$) is a function of the location, then this means that changes from ($c_1(x,y)$, $c_2(x,y)$) manifest themselves in a change in the relative positioning between the cells in the motif image plane and the lenses, which leads to fluctuations in the periodicity of the motif image elements.

For example, a location dependence of the vector ($c_1(x,y)$, $c_2(x,y)$) can advantageously be used if a foil web is used that, on the front, bears a lens embossing having a contiguously homogeneous grid W. If a modulo magnification arrangement having location-independent ($c_1$, $c_2$) is embossed on the reverse, then it is left to chance which features are perceived from which viewing angles if no exact registration is possible between the front and reverse embossing. If, on the other hand, ($c_1(x,y)$, $c_2(x,y)$) is varied transverse to the foil running direction, then a strip-shaped region that fulfills the required positioning between the front and reverse embossing is found in the running direction of the foil.

Furthermore, ($c_1(x,y)$, $c_2(x,y)$) can, for example, also be varied in the running direction of the foil in order to find, in every strip in the longitudinal direction of the foil, sections that exhibit the correct register. In this way, it can be prevented that metalized hologram strips or security threads look different from banknote to banknote.

End of Example 18

Lastly, a generalization of the modulo magnification arrangement is mentioned in which the lens elements (or the viewing elements in general) need not be arranged in the form of a regular lattice, but rather can be distributed arbitrarily in space with differing spacing. The motif image designed for viewing with such a general viewing element arrangement can then no longer be described in modulo notation, but is unambiguously defined by the following relationship $$m(x, y) = \sum_{w \in W} \chi_{M(w)}(x, y) \cdot (f_2 \cdot p_w^{-1})(x, y, \min \langle p_w(f_1^{-1}(1)) \cap pr_{XY}^{-1}(x, y), e_Z \rangle).$$

Here, $$pr_{XY}: R^3 \to R^2, pr_{XY}(x, y, z) = (x, y)$$

is the projection on the XY plane,
$\langle a, b \rangle$
represents the scalar product, where $\langle (x, y, z), e_z \rangle$, the scalar product of $(x, y, z)$ with $e_z = (0, 0, 1)$ yields the z component, and the set notation
$\langle A, x \rangle = \{\langle a, x \rangle | a \in A\}$
was introduced for abbreviation. Further, the characteristic function is used that, for a set A, is given by $$\chi_A(x) = \begin{cases} 1 & \text{if } x \in A \\ 0 & \text{otherwise} \end{cases}$$

and the circular grid or lens grid $W = \{w_1, w_2, w_3, \ldots\}$ is given by an arbitrary discrete subset of $R^3$.

The perspective mapping to the grid point $w_m = (x_m, y_m, z_m)$ is given by $p_{wm}: R^3 \to R^3$, $$p_{wm}(x, y, z) = ((z_m x - x_m z)/(z_m - z), (z_m y - y_m z)/(z_m - z), (z_m z)/(z_m - z))$$

A subset M(w) of the plane of projection is allocated to each grid point $w \in W$. Here, for different grid points, the associated subsets are assumed to be disjoint. Let the solid K to be modeled be defined by the function $f = (f_1, f_2): R^3 \to R^2$, wherein $$f_1(x, y, z) = \begin{cases} 1 & \text{if } x \in K \\ 0 & \text{otherwise} \end{cases}$$

$f_2(x, y, z)$ = is the brightness of the solid K at the position (x,y,z)

Then the above-mentioned formula can be understood as follows:

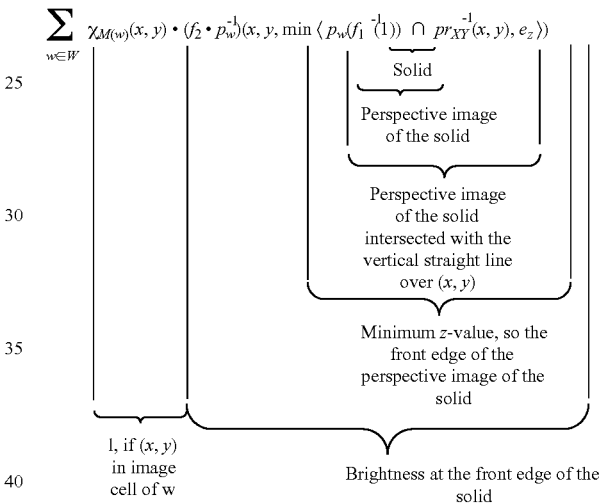

The invention claimed is:

1. A security element for security papers, value documents, or other non-transitory data carriers, the security element comprising:
    (A) a motif layer including a motif image that is subdivided into a plurality of cells, in each of which are arranged imaged regions of a planar target image defined by an image function $f(x,y)$,
    (B) a viewing grid composed of a plurality of viewing elements for reconstructing the target image when the motif image is viewed with the aid of the viewing grid, the motif image of the motif layer having an image function $m(x,y)$ that is given by $$m(x, y) = f\left(\binom{x}{y}\right) + (A(x, y) - 1) \cdot$$

$$\left(\left(\left(\binom{x}{y} + w_d(x, y)\right) \bmod W\right) - w_d(x, y) - w_c(x, y)\right) \cdot g(x, y)$$

where $w_d(x, y) = W \cdot \binom{d_1(x, y)}{d_2(x, y)}$ and

-continued $$w_c(x, y) = W \cdot \begin{pmatrix} c_1(x, y) \\ c_2(x, y) \end{pmatrix},$$

such that the planar target image is reconstructed when the motif image of the motif layer is viewed through the viewing grid;

wherein a unit cell of the viewing grid being described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the matrix $$A(x, y) = \begin{pmatrix} a_{11}(x, y) & a_{12}(x, y) \\ a_{21}(x, y) & a_{22}(x, y) \end{pmatrix}$$

describes a desired magnification and movement behavior of the reconstructed planar target image, the vector $(c_1(x,y), c_2(x,y))$, where $0 \le c_1(x,y), c_2(x,y) < 1$, indicates position of the center of the viewing elements relative to the cells of the motif image of the motif layer, the vector $(d_1(x,y), d_2(x,y))$, where $0 \le d_1(x,y), d_2(x,y) < 1$, represents a location-dependent displacement of cell boundaries of the plurality of cells in the motif image of the motif layer, g(x,y) is a mask function for adjusting visibility of the reconstructed planar target image, and wherein the reconstructed planar target image either exhibits no periodicity, or exhibits a periodicity that is described by a 2×2 matrix P, wherein the periodicity unit cell is not equal to (A−I) W.

2. The security element according to claim 1, characterized in that the plurality of viewing elements are arranged periodically or locally periodically, wherein if arranged locally periodically, the local period parameters either changing, in relation to the periodicity length, only slowly, or an abrupt change in the periodicity length occurring if it was previously kept constant or nearly constant over a segment that is large compared with the periodicity length.

3. The security element according to claim 1, characterized in that a periodicity length or a local periodicity length of the viewing elements is between 3 μm and 50 μm, preferably between 5 μm and 30 μm, particularly preferably between about 10 μm and about 20 μm.

4. The security element according to claim 1, characterized in that the viewing elements are formed by non-cylindrical microlenses or concave microreflectors, especially by microlenses or concave microreflectors having a circular or polygonally delimited base area.

5. The security element according claim 1, characterized in that the viewing elements are formed by elongated cylindrical lenses or concave cylindrical reflectors whose dimension in the longitudinal direction measures more than 250 μm, preferably more than 300 μm, particularly preferably more than 500 μm and especially more than 1 mm.

6. The security element according to claim 1, characterized in that the viewing elements are formed by circular apertures, slit apertures, circular or slit apertures provided with reflectors, aspherical lenses, Fresnel lenses, GRIN (Gradient Refractive Index) lenses, zone plates, holographic lenses, concave reflectors, Fresnel reflectors, zone reflectors or other elements having a focusing or also masking effect.

7. The security element according to claim 1, characterized in that a support of the image function $$f\left((A - I) \cdot \begin{pmatrix} x \\ y \end{pmatrix}\right)$$

is greater than the unit cell of the viewing grid W.

8. The security element according to claim 1, characterized in that the viewing grid and the motif layer are firmly joined together to form the security element having a stacked, spaced-apart viewing grid and motif layer.

9. The security element according to claim 8, characterized in that the motif layer and the viewing grid are arranged at opposing surfaces of an optical spacing layer.

10. The security element according to claim 8, characterized in that the security element is a security thread, a tear strip, a security band, a security strip, a patch or a label for application to a security paper, value document or the like.

11. The security element according to claim 10, characterized in that the magnification and movement matrix A is given by $$A = \begin{pmatrix} a_{11} & a_{12} \\ a_{21} & a_{22} \end{pmatrix} = \begin{pmatrix} v_1 \cdot \cos\phi_1 & v_2 \cdot \cos\phi_2 \\ v_1 \cdot \sin\phi_1 & v_2 \cdot \sin\phi_2 \end{pmatrix}$$

such that the reconstructed planar target image, upon tilting the security element horizontally about a vertical axis, moves with a speed $v_1$ in the direction $\phi_1$ in relation to the x-axis, and upon tilting the security element vertically about a horizontal axis, moves with the speed $v_2$ in the direction $\phi_2$ in relation to the x-axis.

12. The security element according to claim 11, characterized in that $\phi_1$ is not equal to 0° and not equal to 180° and/or $\phi_2$ is not equal to 90° and not equal to −90° and/or $v_1$ is not equal to $v_2$.

13. The security element according to claim 11, characterized in that, upon tilting the security element, the reconstructed planar target image always moves in the same direction, irrespective of the tilt direction.

14. The security element according to claim 8, characterized in that the total thickness of the security element is below 50 μm, preferably below 30 μm and particularly preferably below 20 μm.

15. The security element according to claim 8, characterized in that, in the magnification and movement matrix A, $a_{11}=z_1/e$ and $a_{22}=z_2/e$, where e denotes the effective distance of the viewing grid from the motif image of the motif layer such that, upon viewing with an eye separation being in the x-direction, the reconstructed planar target image is visible at a depth or height $z_1$, and when the security element, rotated by 90°, is viewed with the eye separation being in the y-direction, is visible at a depth or height $z_2$.

16. The security element according to claim 15, characterized in that, in the magnification and movement matrix A, $$a_{11}=z_1/e,\ a_{21}=(z_1/e)\tan\phi_1$$

$$a_{22}=z_2/e,\ a_{12}=(z_2/e)\cot\phi_2$$

such that,
upon viewing with the eye separation being in the x-direction, the reconstructed planar target image is visible at a depth or height $z_1$ and, upon tilting the security element horizontally or upon a horizontal change in the viewing direction, moves in the direction $\phi_1$ in relation to the x-axis, and when the security element, rotated by 90°, is viewed with the eye separation being in the y-direction, the reconstructed planar target image is visible at a depth or height $z_2$ and, upon tilting the security element vertically or upon a vertical change in the viewing direction, moves in the direction $\phi_2$ in relation to the x-axis.

17. The security element according to claim 15, characterized in that one or more of the magnifications $z_1$, $z_2$ and movement directions $\phi_1$, $\phi_2$ are location dependent.

18. The security element according to claim 8, characterized in that the viewing grid is a slot grid, cylindrical lens grid or cylindrical concave reflector grid whose unit cell is given by $$W = \begin{pmatrix} \cos\gamma & -\sin\gamma \\ \sin\gamma & \cos\gamma \end{pmatrix} \cdot \begin{pmatrix} d & 0 \\ 0 & \infty \end{pmatrix}$$

where d is the slot or cylinder axis distance and the direction of the slot or cylinder axis is specified by an angle $\gamma$, and in that the magnification and movement matrix A is given by $$A = \begin{pmatrix} \cos\gamma & -\sin\gamma \\ \sin\gamma & \cos\gamma \end{pmatrix} \cdot \begin{pmatrix} a_{11} & 0 \\ a_{21} & 1 \end{pmatrix} \cdot \begin{pmatrix} \cos\gamma & \sin\gamma \\ -\sin\gamma & \cos\gamma \end{pmatrix}$$

where $\begin{pmatrix} a_{11} & 0 \\ a_{21} & 1 \end{pmatrix} = \begin{pmatrix} v_1 \cdot \cos\phi_1 & 0 \\ v_1 \cdot \sin\phi_1 & 1 \end{pmatrix} = \begin{pmatrix} \frac{z_1}{e} & 0 \\ \frac{z_1}{e} \cdot \tan\phi_1 & 1 \end{pmatrix}$, where $\phi_1$ is a prechosen movement direction.

19. The security element according to claim 1, characterized in that the viewing grid and the motif layer are arranged at different positions of a non-transitory data carrier such that the viewing grid and the motif layer are stackable for self-authentication and form the security element in the stacked state.

20. The security element according to claim 19, characterized in that the viewing grid and the motif layer are stackable by bending, creasing, buckling or folding the non-transitory data carrier.

21. The security element according to claim 1, characterized in that the magnification and movement matrix A is location independent.

22. The security element according to claim 1, characterized in that the cell boundaries in the motif image of the motif layer are not displaced location dependently and in that the vector $(d_1(x,y), d_2(x,y))$ occurring in the image function m(x,y) is constant.

23. The security element according to claim 1, characterized in that the cell boundaries in the motif image of the motif layer are displaced location dependently, preferably in that the motif image of the motif layer exhibits two or more subregions having a different, in each case constant, cell grid.

24. The security element according to claim 1, characterized in that the mask function g is identical to 1.

25. The security element according to claim 1, characterized in that the mask function g is zero in subregions, especially in edge regions of the cells of the motif image of the motif layer, and in this way describes an angle limit when the reconstructed planar target image is viewed, or an image field limit in which the reconstructed planar target image does not become visible.

26. The security element according to claim 1, characterized in that the relative position of the center of the viewing elements is location independent within the cells of the motif image of the motif layer, and the vector $(c_1(x,y), c_2(x,y))$ is constant.

27. The security element according to claim 1, characterized in that the relative position of the center of the viewing elements is location dependent within the cells of the motif image of the motif layer.

28. The security element according to claim 1, characterized in that the motif image is present in a printing layer or an embossed layer.

29. The security element according to claim 1, characterized in that the image contents of individual cells of the motif image of the motif layer are interchanged according to the definition of the image function m(x,y).

30. A method for manufacturing a security element according to claim 1, in which is calculated, from the planar target image that is given by the image function f(x,y), the motif image of the motif layer that is subdivided into a plurality of cells, in each of which are arranged imaged regions of the planar target image, the motif image having an image function m(x,y) that is calculated by $$m(x,y) = f\left(\begin{pmatrix} x \\ y \end{pmatrix} + (A(x,y)-I)\left(\left(\begin{pmatrix} x \\ y \end{pmatrix} + w_d(x,y)\right) \bmod W\right) - w_d(x,y) - w_c(x,y)\right) \cdot g(x,y)$$

where $w_d(x,y) = W \cdot \begin{pmatrix} d_1(x,y) \\ d_2(x,y) \end{pmatrix}$ and $w_c(x,y) = W \cdot \begin{pmatrix} c_1(x,y) \\ c_2(x,y) \end{pmatrix}$ such that the planar target image is reconstructed upon viewing the motif image with the aid of the viewing grid, wherein the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the matrix $$A(x, y) = \begin{pmatrix} a_{11}(x, y) & a_{12}(x, y) \\ a_{21}(x, y) & a_{22}(x, y) \end{pmatrix}$$

describes a desired magnification and movement behavior of the reconstructed planar target image upon tilting the security element, the vector $(c_1(x,y), c_2(x,y))$, where $0 \leq c_1(x,y), c_2(x,y) < 1$, indicates the relative position of the center of the viewing elements within the cells of the motif image of the motif layer, the vector $(d_1(x,y), d_2(x,y))$, where $0 \leq d_1(x,y), d_2(x,y) < 1$, represents a location-dependent displacement of the cell boundaries in the motif image of the motif layer, $g(x,y)$ is a mask function for adjusting the visibility of the reconstructed planar target image, and wherein the reconstructed planar target image either exhibits no periodicity, or exhibits a periodicity that is described by a 2×2 matrix P, wherein the periodicity unit cell is not equal to (A−I) W.

31. The method according to claim 30, characterized in that the viewing grid and the motif layer are firmly joined together to form the security element having a stacked, spaced-apart viewing grid and motif layer.

32. The method according to claim 30, characterized in that the viewing grid and the motif layer are arranged at different positions of a non-transitory data carrier such that the viewing grid and the motif layer are stackable for self-authentication and form the security element in the stacked state.

33. A security paper for manufacturing security or value documents, such as banknotes, checks, identification cards, certificates or the like, having the security element according to claim 1.

34. A non-transitory data carrier, especially a branded article, value document, decorative article or the like, having the security element according claim 1.

35. The non-transitory data carrier according to claim 34, characterized in that the viewing grid and/or the motif layer of the security element is arranged in a window region of the non-transitory data carrier.

36. A security element for security papers, value documents, or other non-transitory data carriers, the security element comprising:
(A) a motif layer having a motif image that is subdivided into a plurality of cells, in each of which are arranged imaged regions of a plurality of planar target images that are given by image functions $f_i(x, y)$, $i=1, 2, \ldots n$, where $n \geq 1$,
(B) a viewing grid composed of a plurality of viewing elements for reconstructing the planar target images when the motif layer is viewed with the aid of the viewing grid,
the motif image of the motif layer having, an image function $m(x, y)$ that is given by $m(x,y) = F(h_1, h_2, \ldots h_n)$, having the describing functions $$h_i(x, y) = f_i\left(\begin{pmatrix} x \\ y \end{pmatrix} + (A_i(x, y) - I) \cdot \left(\left(\left(\begin{pmatrix} x \\ y \end{pmatrix} + w_{di}(x, y)\right) \bmod W\right) - w_{di}(x, y) - w_{ci}(x, y)\right)\right) \cdot g_i(x, y)$$

where $w_{di}(x, y) = W \cdot \begin{pmatrix} d_{i1}(x, y) \\ d_{i2}(x, y) \end{pmatrix}$ and $w_{ci}(x, y) = W \cdot \begin{pmatrix} c_{i1}(x, y) \\ c_{i2}(x, y) \end{pmatrix}$, such that the plurality of planar target images are reconstructed when the motif image is viewed through the viewing grid;

wherein:

$F(h_1, h_2, \ldots h_n)$ is a master function that indicates an operation on the n describing functions $h_i(x, y)$, a unit cell of the viewing grid being described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the matrices $$A_i(x, y) = \begin{pmatrix} a_{i11}(x, y) & a_{i12}(x, y) \\ a_{i21}(x, y) & a_{i22}(x, y) \end{pmatrix}$$

each describe a desired magnification and movement behavior for the reconstructed planar target image $f_i$, the vectors $(c_{i1}(x, y), c_{i2}(x, y))$, where $0 \leq c_{i1}(x, y), c_{i2}(x, y) < 1$, indicate in each case, for the target image $f_i$, the relative position of the center of the viewing elements within the cells i of the motif layer, the vectors $(d_{i1}(x, y), d_{i2}(x, y))$, where $0 \leq d_{i1}(x, y), d_{i2}(x, y) < 1$, each represent a location-dependent displacement of the cell boundaries in the motif image of the motif layer, $g_i(x, y)$ are mask functions for adjusting the visibility of the reconstructed planar target image $f_i$, and wherein at least one of the reconstructed planar target images either exhibits no periodicity, or exhibits a periodicity that is described by a 2×2 matrix P, wherein the periodicity unit cell is not equal to (A−I) W.

37. The security element according to claim 36, characterized in that at least one of the describing functions $h_i(x, y)$ is designed according to an image function $m(x, y)$ that is given by $$m(x, y) = f\left(\begin{pmatrix} x \\ y \end{pmatrix} + (A(x, y) - I)\left(\left(\left(\begin{pmatrix} x \\ y \end{pmatrix} + w_d(x, y)\right) \bmod W\right) - w_d(x, y) - w_c(x, y)\right)\right) \cdot g(x, y)$$

where $w_d(x, y) = W \cdot \begin{pmatrix} d_1(x, y) \\ d_2(x, y) \end{pmatrix}$ and $w_c(x, y) = W \cdot \begin{pmatrix} c_1(x, y) \\ c_2(x, y) \end{pmatrix}$.

38. The security element according to claim 36, characterized in that the security element depicts an alternating image, a motion image or a morph image.

39. The security element according to claim 36, characterized in that the mask functions $g_i$ define a strip-like or checkerboard-like alternation of the visibility of the reconstructed planar target images $f_i$.

40. The security element according to claim 36, characterized in that the master function F constitutes the sum function.

41. The security element according to claim 36, characterized in that two or more reconstructed planar target images $f_i$ are visible simultaneously.

42. The security element according to claim 41, characterized in that the master function F constitutes the sum function, the maximum function, an OR function, an XOR function or another logic function.

43. The security element according to claim 41, characterized in that n reconstructed planar target images $f_j(x,y)$, $j=1,\ldots n$ are specified that each lie at an apparent depth $z_j$, where $z_j > z_{j-1}$, and in that, as the master function F, a modified minimum function is chosen through which, in the event that, at a position $(x,y)$, the describing functions $h_j$ are not equal to zero for multiple j, the smallest j is selected.

44. The security element according to claim 36, characterized in that the viewing grid and the motif layer are firmly joined together to form the security element having a stacked, spaced-apart viewing grid and motif layer.

45. The security element according to claim 44, characterized in that the motif layer and the viewing grid are arranged at opposing surfaces of an optical spacing layer.

46. The security element according to claim 44, characterized in that the security element is a security thread, a tear strip, a security band, a security strip, a patch or a label for application to a security paper, value document or the like.

47. The security element according to claim 44, characterized in that the total thickness of the security element is below 50 μm, preferably below 30 μm and particularly preferably below 20 μm.

48. The security element according to claim 36, characterized in that the viewing grid and the motif layer are arranged at different positions of a non-transitory data carrier such that the viewing grid and the motif layer are stackable for self-authentication and form the security element in the stacked state.

49. The security element according to claim 48, characterized in that the viewing grid and the motif layer are stackable by bending, creasing, buckling or folding the non-transitory data carrier.

50. A method for manufacturing a security element according to claim 36, in which is calculated, from the plurality of planar target images that are given by image functions $f_i(x,y)$, $i=1, 2, \ldots n$, where $n \geq 1$, a motif image of the motif layer that is subdivided into a plurality of cells, in each of which are arranged imaged regions of the planar target images, the motif image having an image function $m(x,y)$ that is calculated by $$m(x, y) = F(h_1, h_2, \ldots h_n)$$ having the describing functions $$h_i(x, y) f_i \left( \begin{pmatrix} x \\ y \end{pmatrix} + (A_i(x, y) - I) \cdot \right.$$

$$\left. \left( \left( \begin{pmatrix} x \\ y \end{pmatrix} + w_{di}(x, y) \right) \bmod W \right) - w_{di}(x, y) - w_{ci}(x, y) \right) \cdot g_i(x, y)$$

where $w_{di}(x, y) = W \cdot \begin{pmatrix} d_{i1}(x, y) \\ d_{i2}(x, y) \end{pmatrix}$ and $w_{ci}(x, y) = W \cdot \begin{pmatrix} c_{i1}(x, y) \\ c_{i2}(x, y) \end{pmatrix}$, such that the reconstructed planar target images are reconstructed upon viewing the motif image with the aid of the viewing grid, wherein $F(h_1, h_2, \ldots h_n)$ is a master function that indicates an operation on the n describing functions $h_i(x, y)$, the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix W=

$$W = \begin{pmatrix} w_{11} & w_{12} \\ w_{21} & w_{22} \end{pmatrix},$$

the matrices $$A_i(x, y) = \begin{pmatrix} a_{i11}(x, y) & a_{i12}(x, y) \\ a_{i21}(x, y) & a_{i22}(x, y) \end{pmatrix}$$

each describe a desired magnification and movement behavior for the reconstructed planar target images $f_i$, the vectors $(c_{i1}(x,y), c_{i2}(x,y))$, where $0 \leq c_{i1}(x,y), c_{i2}(x,y) < 1$, indicate in each case, for the reconstructed planar target image $f_i$, the relative position of the center of the viewing elements within the cells i of the motif image of the motif layer, the vectors $(d_{i1}(x,y), d_{i2}(x,y))$, where $0 \leq d_{i1}(x,y), d_{i2}(x,y) < 1$, each represent a location-dependent displacement of the cell boundaries in the motif image of the motif layer, $g_i(x, y)$ are mask functions for adjusting the visibility of the reconstructed planar target images $f_i$, and wherein at least one of the reconstructed planar target images either exhibits no periodicity, or exhibits a periodicity that is described by a 2×2 matrix P, wherein the periodicity unit cell is not equal to $(A-I)W$.

\* \* \* \* \*